(12) United States Patent
Joyce et al.

(10) Patent No.: US 10,809,868 B1
(45) Date of Patent: Oct. 20, 2020

(54) SIMPLIFIED FEATURE MANAGEMENT

(71) Applicant: EMC IP Holding Company LLC, Hopkinton, MA (US)

(72) Inventors: Scott E. Joyce, Foxboro, MA (US); Timothy J. Cox, Mendon, MA (US); Norman M. Miles, Bedford, MA (US); Donald E. Labaj, Northborough, MA (US); Nancy Welch, Charlton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 376 days.

(21) Appl. No.: 14/579,209

(22) Filed: Dec. 22, 2014

(51) Int. Cl.
*G06F 3/0481* (2013.01)
*G06F 3/0484* (2013.01)

(52) U.S. Cl.
CPC ........ *G06F 3/0481* (2013.01); *G06F 3/04847* (2013.01)

(58) Field of Classification Search
CPC .... G06F 21/604; G06F 21/629; G06F 3/0481; G06F 3/04847
See application file for complete search history.

(56) References Cited

U.S. PATENT DOCUMENTS

| | | | | |
|---|---|---|---|---|
| 5,673,401 A | * | 9/1997 | Volk | G06F 3/04847 348/E5.103 |
| 6,236,996 B1 | * | 5/2001 | Bapat | G06F 1/00 |
| 6,538,669 B1 | * | 3/2003 | Lagueux, Jr. | G06F 3/0481 711/170 |
| 8,024,794 B1 | * | 9/2011 | Feldman | G06F 21/6218 235/382 |
| 8,112,489 B1 | * | 2/2012 | Cox | G06F 11/2033 709/208 |
| 8,234,380 B1 | * | 7/2012 | Tetreault | H04L 67/1097 709/208 |
| 2003/0061482 A1 | * | 3/2003 | Emmerichs | G06F 21/604 713/165 |
| 2008/0134097 A1 | * | 6/2008 | Uchimura | G11B 27/32 715/840 |
| 2009/0138794 A1 | * | 5/2009 | Becker | G06F 9/4443 715/234 |
| 2010/0058434 A1 | * | 3/2010 | Chusing | G06F 21/604 726/1 |
| 2011/0106771 A1 | * | 5/2011 | McDonald | G06F 17/30194 707/663 |
| 2011/0161881 A1 | * | 6/2011 | Tomita | H04N 1/00408 715/825 |

(Continued)

*Primary Examiner* — Daniel W Parcher
(74) *Attorney, Agent, or Firm* — Muirhead and Saturnelli, LLC

(57) ABSTRACT

Techniques for determining a view state for a user interface element are described. A first value for a feature key associated with the user interface element is determined in accordance with feature level criteria and a current context. The first value denotes a first view state for the user interface element. A second value for a second view state for the user interface element is determined in accordance with user interface element level criteria and the current context. A final view state for the user interface element is determined in accordance with the first view state and the second view state. The user interface element is rendered in a user interface in accordance with the final view state.

20 Claims, 12 Drawing Sheets

(56) References Cited

U.S. PATENT DOCUMENTS

| | | | | |
|---|---|---|---|---|
| 2014/0109236 A1* | 4/2014 | Novick | ............... | G06F 21/10 726/27 |
| 2015/0248247 A1* | 9/2015 | Andrews | ............ | G06F 3/0634 711/103 |

* cited by examiner

| 1002<br>First view state<br>(feature level criteria) | 1004<br>Second view state<br>(UI element level criteria) | 1006<br>Final view state |
|---|---|---|
| HIDDEN | ANY | HIDDEN |
| ANY | HIDDEN | HIDDEN |
| DISABLE | ENABLE | DISABLE |
| ENABLE | DISABLE | DISABLE |
| ENABLE | ENABLE | ENABLE |

SIMPLIFIED FEATURE MANAGEMENT

BACKGROUND

Technical Field

This application generally relates to user interfaces and, more specifically, to techniques for enabling, disabling and hiding user interface content.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of the invention is a method of determining a view state for a user interface element comprising: determining, in accordance with feature level criteria and a current context, a first value for a feature key associated with the user interface element, said first value denoting a first view state for the user interface element; determining, in accordance with user interface element level criteria and the current context, a second value for a second view state for the user interface element; determining a final view state for the user interface element in accordance with the first view state and the second view state; and rendering the user interface element in a user interface in accordance with the final view state. The feature key may be a property of the user interface element. The feature level criteria may be included in one or more rules. Determining the first value may include evaluating the one or more rules in accordance with the current context. The feature level criteria may relate to any of an operating mode of a data storage system, role of a user interacting with user interface, black content, a license, and whether a feature or functionality is supported by a third party. The feature key may be associated with a feature or functionality of a data storage system. The feature or functionality may related to any of provisioning storage for a logical device, deleting a logical device, configuring a RAID group, creating a file system, deleting a file system, a data replication facility, a data deduplication facility, adding a user account, deleting a user account, and a snapshot facility. The current context may include any of a current state of a data storage system, a current operating mode of a data storage system, installed software on a data storage system, hardware on a data storage system, valid licenses for data storage facilities or services on a data storage system, role of a user interacting with the user interface, one or more features or functionality which are designated as black content and thereby not operational, and one or more features or functionality that is unsupported. The first view state may be hidden, enable or disable, the second view state may be hidden, enable or disable, and the one or more rules may include a plurality of rules evaluated in a sequential order where evaluation of the plurality of rules stops upon a first of the plurality of rules determining a value of hidden for the first value. The final view state may be hidden if any of the first view state and the second view state are hidden. The final view state may be disable if any of the first view state and the second view state is disable and none of the first view state and second view state are hidden. The final view state may be enable if both the first view state and the second view state are enable. The user interface element may be any of a menu, a menu bar, a menu item, a text box, a button, a navigation section including one or more hyperlinks, a hyperlink, a table, a drop-down list, a list box, a check box, a dialog box, a wizard, a table, a column of a table, a form, a field of a form, and a combo box.

In accordance with another aspect of the invention is a computer readable medium comprising code store thereon that, when executed, performs a method comprising: determining, in accordance with feature level criteria and a current context, a first value for a feature key associated with a user interface element, said first value denoting a first view state for the user interface element; determining, in accordance with user interface element level criteria and the current context, a second value for a second view state for the user interface element; determining a final view state for the user interface element in accordance with the first view state and the second view state; and rendering the user interface element in a user interface in accordance with the final view state.

In accordance with another aspect of the invention is a system comprising: a data storage system; a processor; and a memory including first code stored thereon for a data storage system management application, the first code, when executed, performs a method of determining a view state for a user interface element comprising: determining, in accordance with feature level criteria and a current context, a first value for a feature key associated with the user interface element, said first value denoting a first view state for the user interface element; determining, in accordance with user interface element level criteria and the current context, a second value for a second view state for the user interface element; determining a final view state for the user interface element in accordance with the first view state and the second view state; and rendering the user interface element in a user interface in accordance with the final view state. The feature key may be a property of the user interface element. The feature level criteria may be included in one or more rules. Determining the first value may include evaluating the one or more rules in accordance with the current context. The feature level criteria may relate to any of operating mode of a data storage system, role of a user interacting with user interface, black content, a license, and whether a feature or functionality is supported by a third party. The feature key may be associated with a feature or functionality of a data storage system and relates to any of provisioning storage for a logical device, deleting a logical device, configuring a RAID group, creating a file system, deleting a file system, a data replication facility, a data deduplication facility, adding a user account, deleting a user account, a monitoring facility that monitors any of performance, health, alerts, and jobs, a facility that manages connectivity to a host, and a snapshot facility.

BRIEF DESCRIPTION OF THE DRAWINGS

Features and advantages of the present invention will become more apparent from the following detailed description of exemplary embodiments thereof taken in conjunction with the accompanying drawings in which:

FIG. 11 is a table representing various view states in an embodiment in accordance with techniques herein.

DETAILED DESCRIPTION OF EMBODIMENT(S)

Figure 1:
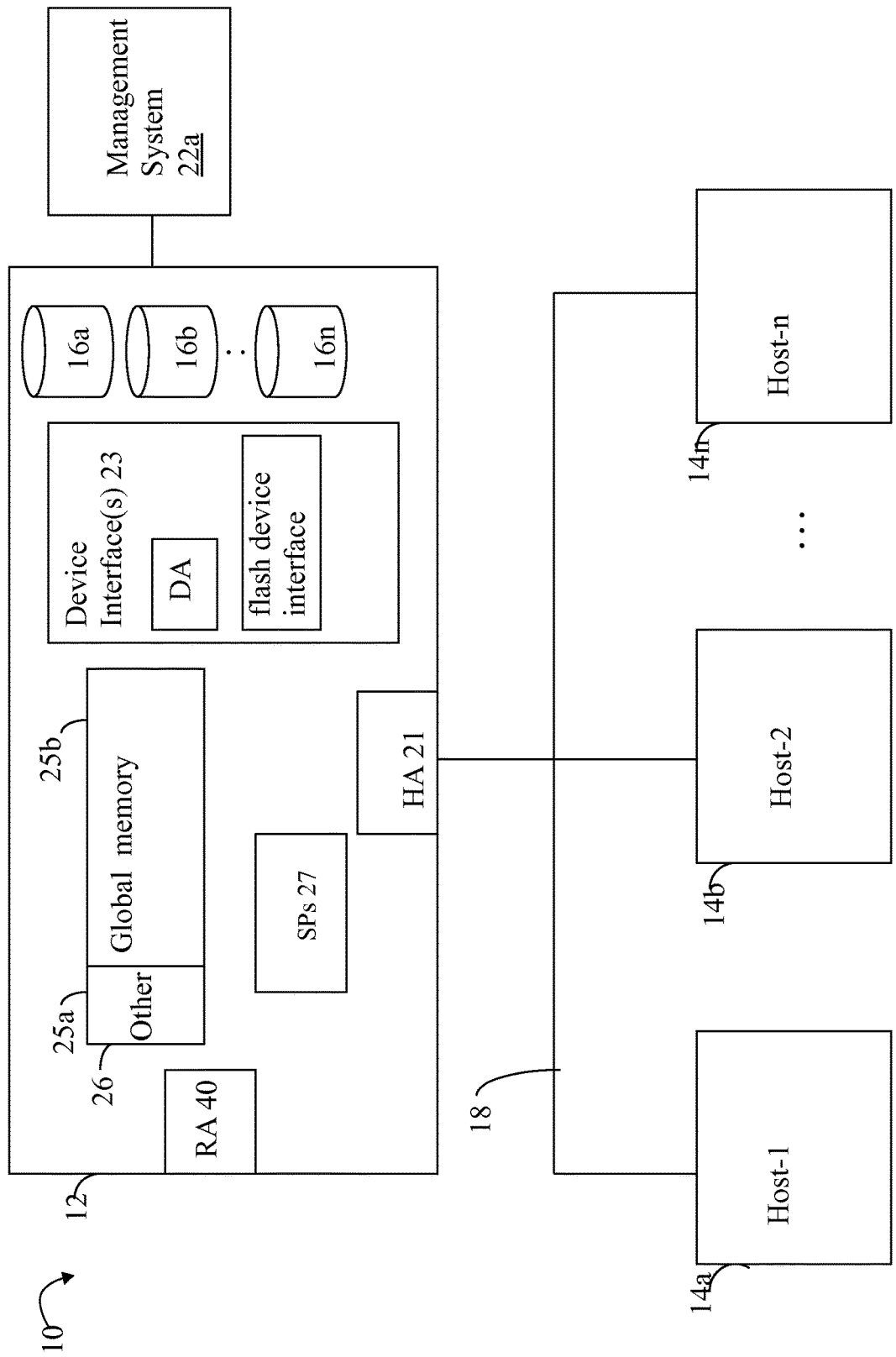
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular PD may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Management software may be used in connection with management of data storage systems. The management software, as well as more generally any software, may obtain inputs used in connection with performing an operation or task. The management software may be characterized as a client which issues requests to a server, such as a data storage system, in connection with performing requested operations. In one embodiment, the data storage system management software, as a client, may execute on a computer system which communicates with the data storage system that services data storage system management requests from the client. More generally, the data storage system management software may execute on any suitable processor including a processor of the data storage system as well as another system or component.

The data storage system management software included in the management system 22a may be used by an administrator in connection with performing data storage management operations. For example, the administrator may view information using a graphical UI (GUI) of the management software regarding the current data storage configuration, may perform an operation such as create or configure a logical entity such as a file system, a database, a RAID group, LUN or LV, storage group (SG) of one or more LUNs, and the like. A logical entity such as a RAID group may be represented by an object having attributes such as indicating a RAID level of the RAID group (e.g., RAID-0, 1, 5, or 6), a number of data and/or parity drives, and the like. During operation of the data storage system management application, its GUI may issue a command request such as in the form of an API call to the data storage system to service the command request. In response to receiving the request, the data storage system may perform processing to service the request and return a response such as, for example, including any requested data storage system configuration information.

The command request issued by the GUI may be, for example, to view information regarding logical and/or physical data storage system entities of the data storage configuration (e.g., list physical storage devices and associated properties and statuses, list logical storage entities such as logical devices having storage provisioned on physical storage devices, list properties of such logical devices), perform an operation (e.g., create, delete, modify) with respect to a logical storage entity (e.g., logical storage device, storage group of one or more logical storage devices)) of the configuration, and the like. The data storage system may include, or otherwise have access to, a data base, or more generally any suitable data container or data store, comprising the data storage system configuration information. The data storage system configuration information may describe the current configuration of the data storage system. The data storage system configuration information may include an object model representation of the different physical and logical entities in the data storage system. For example, the configuration information may include objects representing current configuration and state of physical entities such as physical storage devices (e.g., disks, solid state storage devices), power supplies, and the like. The configuration information may also include objects representing current configuration and state of logical entities such as RAID groups and/or storage pools (e.g., configured logical groupings of physical storage devices), LUNs having physical storage configured from such RAID groups and/or storage pools, storage groups (e.g., logical groupings of one or more LUNs), and the like.

In this manner, the data storage system as a server may service a request from the GUI of the data storage system management software such as by retrieving requested data from the data storage system configuration information data base in connection with a request to get or read configuration information. Servicing performed by the data storage system may also include creating, updating and/or otherwise generally modifying the data storage system configuration information database in connection with a request, for example, to provision storage for a new LUN, create a new storage group, add new physical storage devices to the system and therefore create corresponding new objects in the database, and the like. In one embodiment, the data storage system configuration information database may include multiple tables of different types of objects. Each object may include one or more properties characterizing and describing the physical or logical entity represented by the object.

In connection with a GUI such as of the data storage system management application, it may be desirable to enable, disable and/or hide various UI elements or components, or more generally, UI content for various reasons or when particular conditions exist. Such variations in displayed UI content may impact, for example, the visible content of the UI as well as various options or interactions possible with a user. Described in following paragraphs are techniques that may be used in connection controlling what UI content of an interface display is enabled, disabled and/or hidden. Such techniques may be used, for example, in connection with the management and control of UI content in connection with a data storage system management application. Although examples and references herein may be made with respect to a GUI of an application for data storage management, more generally, the techniques herein may be used in connection with any suitable user interface (UI) for any application.

Although exemplary uses herein may be made with reference to particular UI elements, it will be appreciated that techniques herein may be used in connection with any suitable UI element or UI content of an interface where the UI element or content may be associated with a property indicating whether to enable, disable, or hide the UI element or content. UI elements may include, for example, a menu, a menu bar, a menu item (e.g., one or more selected menu items from a menu), a text box, a button (e.g., radio button, cycle button), a wizard, a navigation section including one or more hyperlinks, a table, a portion of a table such as one or more selected columns of the table, a form, one or more fields of the form, a drop-down list, a list box, a check box, a dialog box, and a combo box. Menus allow the user to execute commands by selecting from a list of choices. Menu options are selected, for example, with a mouse or other pointing device within a GUI. A keyboard may also be used. A menu may be, for example, a pull-down menu displayed in response to a user selection. A menu bar may be displayed horizontally across the top of the screen and/or along the tops of some or all windows. A software wizard is a UI type that presents a user with a sequence of dialog boxes that lead the user through a series of well-defined steps. A text box may be a box in which to enter text or numbers. A hyperlink may be displayed as text with some visual indicator (such as underlining and/or color) indicating that selecting the link will result in linking or displaying another screen or page. Properties of a hyperlink may relate to whether the hyperlink is enabled, disabled or hidden. If enabled, the particular path or location identifying a website or the web page may be displayed in response to selection of the hyperlink. A drop-down list may be a list of items from which to select. The list normally only displays items when a special button or indicator is selected. A list box allows a user to select one or more items from a list contained within a static, multiple line text box. A combo-box may be a combination of a drop-down list or list box and a single-line textbox, allowing the user to either type a value directly into the control or choose from the list of existing options. A check box indicates an "on" or "off" state via a check mark ☑ or a cross ☒. A radio button is similar to a check-box, except that only one item in a group can be selected. Its name comes from the mechanical push-button group on a car radio receiver. Selecting a new item from the group's buttons also deselects the previously selected button. A cycle button is a type of button that cycles its content through two or more values, thus enabling selection of one from a group of items. A table may also be referred to as a grid in which numbers and/or text may be displayed in rows and columns. The foregoing are some examples of UI elements that may be used in an embodiment in accordance with techniques herein which may be enabled, disabled or hidden in a UI display. UI content that is disabled may be visible yet non-functional in the sense that any controls or interactions with the user are disabled or inactive. Disabled UI content may be displayed in a UI and visually denoted as disabled such as by greying out the disabled UI content. Hidden UI content is not visible on the UI display.

Generally, some UI elements may include one or more other UI elements. For example, a first UI element such as a form or panel may include other UI elements of a finer granularity (e.g., form may include multiple fields for input and/or output, panel may include one or more buttons or fields). Techniques herein may be applied to any single suitable UI element at any level. For example, as described elsewhere herein, such techniques may be applied to the entire form, or one or more selected fields of the form.

As described herein, feature management may be characterized as the ability to enable, disable and/or hide UI content at runtime which impacts the visible content displayed as well as impacts user interactions by varying at runtime the functionality and options presented to the user. As noted above, there are many reasons why UI content may be enabled, disabled and/or hidden such as at a feature or functional level. In other words, at the feature or functional level, it may be desirable to enable, disable or hide all UI content related to a particular feature or functionality.

For example, UI content may be disabled or hidden because such UI content is also referred to as black content. Black content may be UI content related to a feature or functionality of an application that is under development and not yet working or operational for its intended purpose. Black content may also relate to feature or functionality not supported on a particular hardware or software platform. Generally, black content may be hidden, for example, by hiding UI elements such as menus providing functionality for a feature that is under development or unsupported for a particular platform.

Whether UI content is enabled, disabled or hidden may also depend on the user role, the license(s) applicable to a particular system, whether the system is in a degraded or unhealthy state, what features are supported by a third party or reseller of the application or system, and the like.

In connection with a user role, it may be desirable to hide or disable UI content depending on the particular user role. For example, a user of a system may have a login ID associated with a role such as "admin" or "operator". An admin may be a data storage system administrator or manager having privileges to perform any/all operations for system management. For example, an admin may be able to create/provision storage for a LUN, delete a LUN, create a file system, delete a file system, and the like. In contrast, an operator may have limited privileges and may, for example, only be able to perform certain operations such as viewing or reading information such as read or view information on existing LUNs. An operator may not, for example, be able to create or delete LUNs or otherwise perform any operation that modifies or updates the data storage system configuration. Thus, UI content related to particular features or functionality may be enabled, disabled or hidden depending on the capabilities and/or privileges associated with a user role.

In connection with a license, UI content for features or functionality may be disabled if a system does not have an installed license to use software and/or hardware providing such features or functionality. In such a case, it may be desirable to disable UI content for additional licensed features that a user could purchase but currently does not have a license for. For example, in a data storage system, different data storage system services and functionality may be licensed such as for local and/or remote data replication, data storage optimizers, and the like. If a data storage system administrator is logged in to a data storage system management application on a system that does not have a license for one or more of the foregoing services or functionality, UI content for the unlicensed services and functionality may be disabled while only UI content for licensed services and functionality is enabled.

In connection with a system, such as a data storage system, the particular mode in which the system is running may affect whether UI content is enabled, disabled or hidden. For example, a data storage system may be in a degraded or unhealthy state due to failure of different components. In such a case, the data storage system may enter a service mode denoting the degraded state whereby only a limited set of operations and features may be exposed to a user by disabling and/or hiding UI content for all other operations and features other than the limited set.

Whether UI content of an application is enabled, disabled and/or hidden may vary with the particular features supported by a third party or reseller of the application or system on which the application resides. For example, a vendor may build and release into market an application that is then purchased for resale and/or redistribution such as by another third party. The third party may purchase the application produced by the vendor and the third party may incorporate or bundle the application with the third party's own software and/or hardware. The third party may want to vary the UI content for various reasons. For example, the third party may want to disable (e.g., such as through greying out a displayed UI element) or otherwise hide (e.g., whereby the UI element is not visible on the UI displayed) particular UI elements, such as buttons, menus, and the like, for functionality of the application or underlying system on which the application executes where such functionality is not provided or supported by the third party.

Thus, the foregoing are some examples of reasons or conditions why it may be desirable to enable, disable or hide all UI content at a feature or functional level such as, for example, hide or disable all UI content related to a particular feature functionality.

Techniques described in following paragraphs allow UI developers to disable or hide UI content by applying a feature key to one or more relevant UI elements in connection with defining the UI layout. A feature key, also referred to as a key, may be defined that corresponds to a particular feature, functionality or operation of the application. The UI developer may "tag" or associate one or more feature keys with a particular UI element to denote that the tagged UI element includes UI content related to the associated one or more feature keys. For example, a first key may be associated with a first feature of an application. A UI element that is a menu may be associated or "tagged" with this first key since the UI element displays menu selections for functionality or operations of this first feature. When rendering a UI display, it may be desirable, for example, to disable all UI content tagged with this first key if the current system does not have the appropriate license for software implementing this first feature. Thus, techniques herein may be used to enable, disable or hide UI content at a feature or functional level by enabling, disabling or hiding UI content tagged with a particular feature key associated with such feature or function.

It should be noted that the level of feature, functional or operational granularity denoted by a single feature key may vary. For example, a single key may have a fine level of granularity where the single key is defined for a single operation, such as to provision storage for a LUN, delete an existing LUN, creating a file system, or deleting a file system. A key may also be defined denoting functionality for a data service or facility, a large group or block of operations or more generally, multiple items/operations of related functionality. For example, a key may be defined for any of deduplication, local replication, remote replication, snapshot, monitoring facilities (e.g., such as monitoring performance, health, alerts, or jobs), managing connectivity to hosts/servers, and the like. As known in the art, deduplication may refer to techniques for removing redundant or duplicate data portions. Local replication may refer to techniques for making a local copy (e.g., on the same system, same data center, or at the same physical site) of a LUN or other data item. Replication generally may refer to making a complete bit for bit copy of the data. Remote replication may refer to techniques for making a remote copy (e.g., on a different physical storage system or at a remote physical site) of a LUN or other data item. Such remote replicated copies may be used, for example, for disaster recovery should the original copy be destroyed or otherwise unavailable for use. Snapshot may refer to a data facility that makes a point in time copy of a LUN or other data item. A snapshot is not a bit for bit physical copy but rather a logical point in time copy of the LUN or data item. Thus, for example, an embodiment in accordance with techniques herein may tag all UI content related to a particular data service or facility with a key denoting that data service so that all the related UI content may be enabled, disabled, or hidden as may be desired such as depending on whether the system has a current and valid license to use the data service or facility.

In connection with the foregoing where a key is associated with a particular feature or function, an embodiment in accordance with techniques herein may specify the key as a property of a UI element. The key may have an associated value that identifies one of disabled, enabled or hidden thereby denoting whether associated or tagged UI element for the associated feature or function should be respectively disabled, enabled or hidden for a particular reason at the functional or feature level.

It should be noted that reasons or conditions at the feature or functional level for determining whether to disable, enable or hide particular UI content associated with the feature or function may be generally referred to as feature level criteria. Examples of feature level criteria that may be used in an embodiment are described herein such as related to black content, user roles, operating mode of the system, licenses, and third parties.

For other reasons or existing conditions independent of the foregoing at the feature or functional level, additional processing may be performed at a local or UI element level for the particular UI display to determine whether the particular UI element should be enabled, disabled or hidden. Such additional processing may be based on additional view-specific logic and rationale. For example, such additional logic may disable or hide a particular UI element to perform an operation, such as delete a LUN, if certain criteria are not met such as if the user has not also selected a LUN from a displayed LUN list in the current UI display. Such additional reasons or logic embodied in the additional processing may be characterized as local to the particular view or current UI display and state.

It should be noted that reasons or conditions at the local or UI element level for determining whether to disable, enable or hide particular UI element may be generally referred to as UI element level criteria.

In an embodiment in accordance with techniques herein, processing may be performed to make a final determination of whether a particular UI element is enabled, disabled or hidden in a current UI display taking into account both the reasons at the feature or functional level (e.g. based on feature level criteria) in combination with the latter local or additional view-specific logic and rationale (e.g., UI element level criteria). For example, all UI content for a particular feature may be disabled such as because there is no valid license on the system for software providing this feature. Additionally, such UI content should remain disabled even if the local view-specific logic indicates that a particular UI element tagged with a key for this feature should be enabled. The foregoing and other aspects of techniques herein are described in more detail in following paragraphs.

Figure 2:
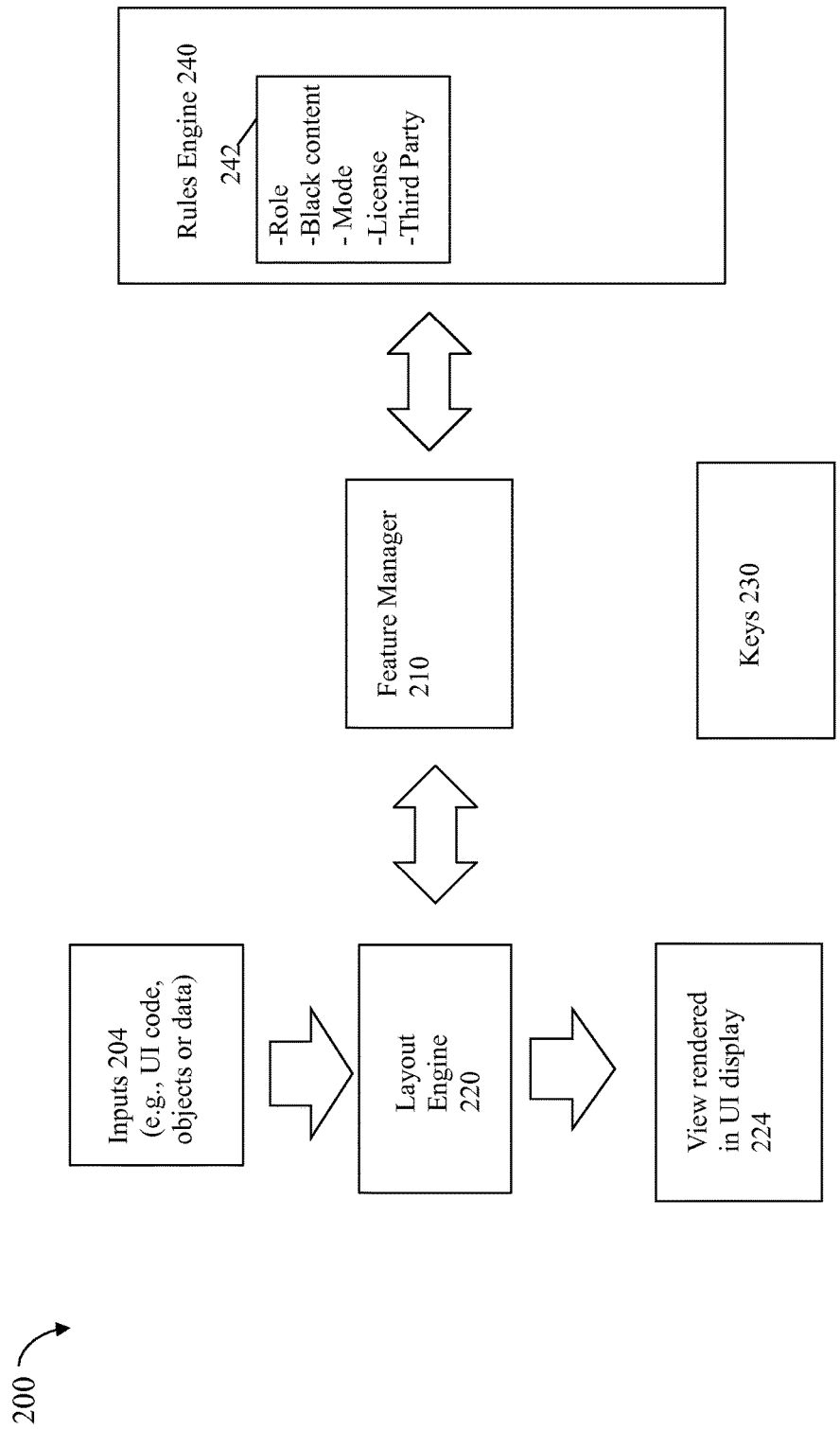
FIG. 2 is an example of components of an application in an embodiment in accordance with techniques herein.

Referring to FIG. 2, shown is an example of an embodiment of components that may be included in an application in accordance with techniques herein. The example 200 illustrates components that may be included in a client, such as a GUI of a data storage system management application.

The layout engine 220 may generate a view 224 that is rendered in a UI display based on inputs 204. The inputs 204 may include, for example, UI code, objects or data to be included in the display, and the like. The UI code may embody the logical processing to render the view for the UI display and processing performed responsive to user actions. The UI code may be written in any one or more suitable coding or scripting languages. The data or objects to be displayed may include, for example, objects of a data storage system configuration such as LUN objects representing existing or defined LUNs in the current data storage system configuration. The UI code may also include layout information such as defining the UI elements and associated properties relevant to a current view to be rendered in the UI display. For example, the UI code may include layout information defining the current UI elements, such as a button, table, checkbox, and the like, and properties of such UI elements. The properties of a UI element may be used to specify various settings affecting how the UI element is presented in the display. For example, such properties may affect the "look and feel" of the UI element. In accordance with techniques herein, a KEYS property may be associated with a UI element denoting one or more feature keys associated with the UI element. Each of the feature keys, or more generally keys, may be associated with a different feature or functionality as described elsewhere herein. Thus, the UI developer may define layout information for a UI view including a UI element. The UI developer may "tag" the UI element with a key using the KEYS property thereby denoting the UI element as associated with the feature or functionality of the key. This is described in more detail elsewhere herein.

The keys 230 may include a set of defined keys for features or functionality provided by the application, system, and the like. For example, in one embodiment in accordance with techniques herein, the keys 230 for a data storage system management application and data storage system may include any of the following keys each denoting a different feature or functionality:

| Key | Associated feature/functionality |
| --- | --- |
| ADD_USER | Add a new user account/id to the data storage system management application |
| DELETE_USER | Delete an existing user account/id of the data storage system management application |
| CREATE_LUN | Create a LUN/provision storage for a new LUN |
| DELETE_LUN | Delete an existing LUN |
| DEDUPLICATION | Deduplication facility and associated functionality that performs data deduplication |
| REPLICATE | Replication facility and associated functionality that replicates a LUN |
| CREATE_FILESYSTEM | Create a new file system |
| DELETE_FILESYSTEM | Delete an existing file system |
| SNAPSHOT | Snapshot facility and associated functionality that creates LUN snapshots |

It should be noted that the foregoing defines a general replication key as REPLICATE. However, as mentioned elsewhere herein and also known in the art, different keys may be defined for different types of replication and different replication facilities such as, for example, for local replication and remote replication.

It should also be noted that an embodiment in accordance with techniques herein may also include other keys denoting other features and functionality than as described herein. Generally, the keys 230 represent a defined set of keys and associated features or functionality as used by the layout engine 220, feature management 210 and rules engine 240.

The keys 230 may be hardcoded into the feature manager as defined strings. Alternatively, other techniques may be used to specify and define keys 230. For example, the set of keys 230 may be included in a data file such as a configuration file that is an input to each of the feature manager 210, layout engine 220 and rules engine 240.

The feature manager 210 may perform processing to determine a current value for a key. For example, during runtime when rendering a UI display, the layout engine 220 may query the feature manager 210 for the current value of a key specified in layout information for a view being rendered. The layout engine 220 needs to know the current values of such keys in order to determine whether each of the UI elements being rendered are enabled, disabled or hidden.

Responsive to receiving a call from the layout engine 220 to determine a value for a key, the feature manager 210 may query the rules engine 240 to determine a current value for the key based on evaluating one or more rules in accordance with a current context or state. The current context or state may relate to the current user of the application, the current state and/or configuration of the data storage system being managed by the application, the current licenses installed on the data storage system, and the like. The rules engine 240 may perform an API call to the data storage system and/or another server to obtain the current state or context such as related to one or the current user, system licenses, current state of the data storage system, and the like. For example, the current user may have an associated ROLE reflected in the current state or context, certain features or functionality may be designated as black content reflected in the current state or context, certain features or functionality may be designated as unsupported or by a third party as reflects in the current context or state, the data storage system may be running or operating in a degraded mode reflected in the current state or context, the current data storage system may be configured and have installed thereon a license to run particular data services or facilities such as data replication, data deduplication, file storage, block storage, a data storage optimizer, and the like, as reflected in the current state or context.

A value for the key may be determined based on one or more rules and the current state or context. Generally, there may be rules expressing the feature level criteria 242 as related to the determining a value of enable, disable or hidden for the current key. For example, assume the feature manager 210 queries the rules engine 240 to determine a value for the DELETE_LUN key described above and elsewhere herein. A first rule, RULE 1, may be defined as follows:
    if (role=admin)
       then DELETE_LUN=ENABLE
       else DELETE_LUN=DISABLE
The foregoing RULE 1 is an example of syntax that may be used to express logic embodied in a rule that indicates a value of ENABLE for the DELETE_LUN key if the current user's role is admin and otherwise DELETE_LUN has a value of disable. Generally, processing performed may sequentially evaluate a set of one or more rules expressing the feature level criteria specifying logical conditions, statements or rationale as to when DELETE_LUN is assigned the different possible values of ENABLE, DISABLE and HIDDEN. As another example, a second rule, RULE 2, may be defined as follows:
    if (mode=service/degraded)
       then DELETE_LUN=HIDDEN
In one embodiment, processing may be performed by the rules engine 240 to sequentially evaluate a set of applicable rules, such as RULE 1 and RULE 2, for determining a current value for the DELETE_LUN key. In such an embodiment, a default value of ENABLE may be initially assigned to the key. A value of HIDDEN assigned to the key as a result of evaluating any rule may supersede or override any other value (e.g., ENABLE and DISABLE) that can be assigned by any other rule. In this case, rule evaluation may be terminated once a rule has been evaluated which assigns a value of HIDDEN to a key. Once a first rule assigns a value of DISABLE to a key, the key value may only be updated by subsequent rule evaluation to HIDDEN or DISABLE. In other words, during rule evaluation, once the key is assigned DISABLE it can never return to ENABLE and once a key is assigned a value of HIDDEN during rule evaluation, rule processing may stop since the key cannot be changed to any other value during rule evaluation.

The components 204, 220, 210, 230 and 240 of FIG. 2 may be implemented, for example, as one or more software modules. In one embodiment, the rules engine 240 may be implemented using a set of handlers, routines or functions for the different reasons or concerns denoted by 242.

Figure 3:
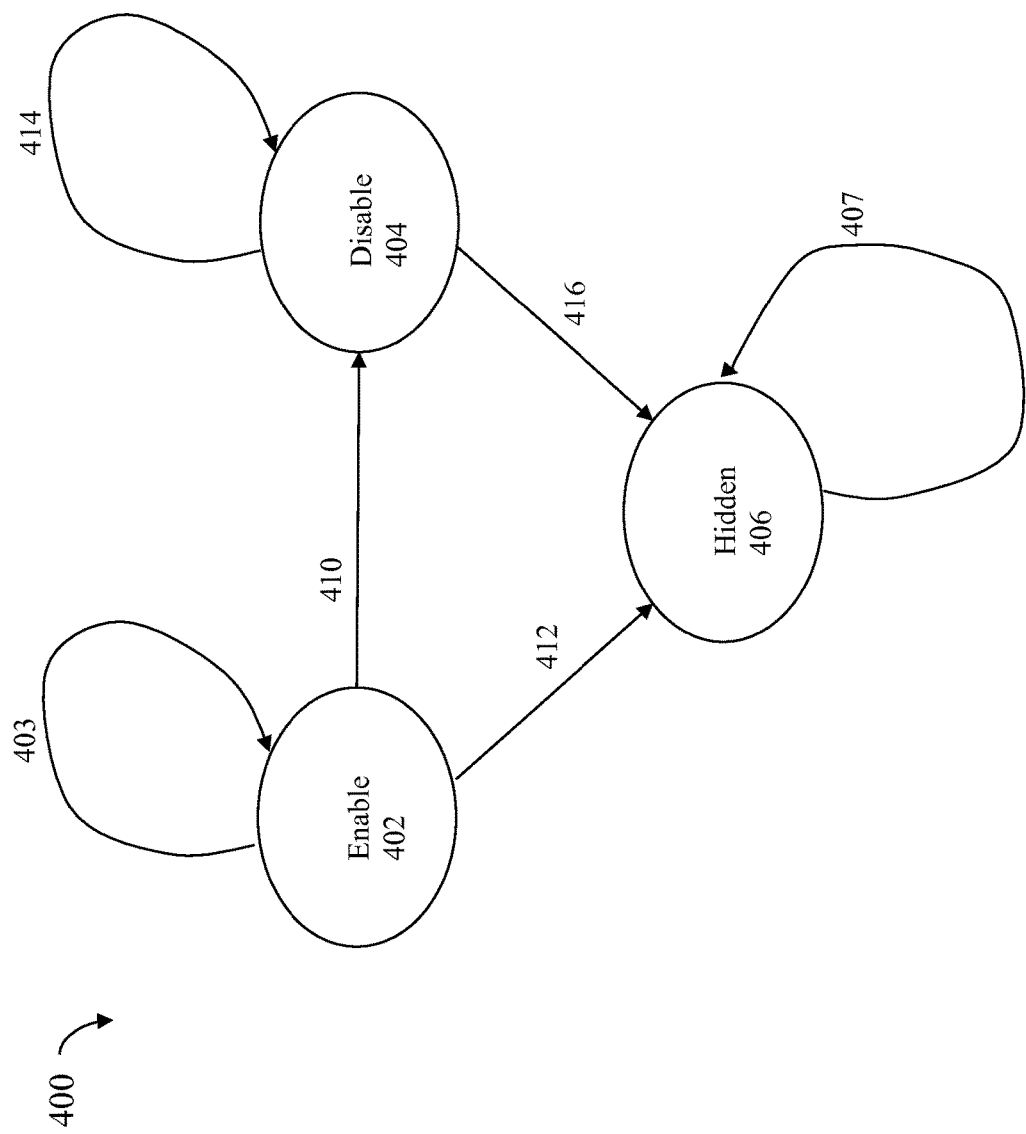
FIG. 3 is an example of a state transition diagram that may be used in an embodiment in accordance with techniques herein.

Referring to FIG. 3, shown is a state diagram illustrating states and transitions for a key value during rule evaluation in an embodiment in accordance with techniques herein. The example 400 includes each of the possible key values of enable, disable and hidden represented respectively as states 402, 404 and 406. The enable state 402 is the start state. Arrows 403, 407, 410, 412, 414 and 416 represent state transitions that may be made during rule evaluation.

During evaluation of rules as related to a key, the key is initially assigned a value of ENABLE corresponding to start state 402. As each rule relevant to the key is evaluated when the key has a value of ENABLE, the key may be assigned a subsequent value corresponding to any of the state transitions. If the current rule evaluation results in a state not represented by state transition (e.g., an invalid state), then the key retains its current value. In this manner, the state transition diagram 400 represents valid transitions that may occur during rule evaluation. If a next rule being evaluated results in a value not represented by a state transition in 400, then the key retains its current value and processing proceeds to the next rule.

As indicated by 400, once any rule results in assigning HIDDEN to a key, the key may not be subsequently assigned any other value other than HIDDEN. Thus, rule evaluation by the rules engine may terminate once any single rule results in assigning HIDDEN to the key. Also illustrated by 400, once a value of DISABLE is assigned to the key, a subsequent rule cannot further assign ENABLE to the key but only assign DISABLE or HIDDEN to the key.

Figure 4:
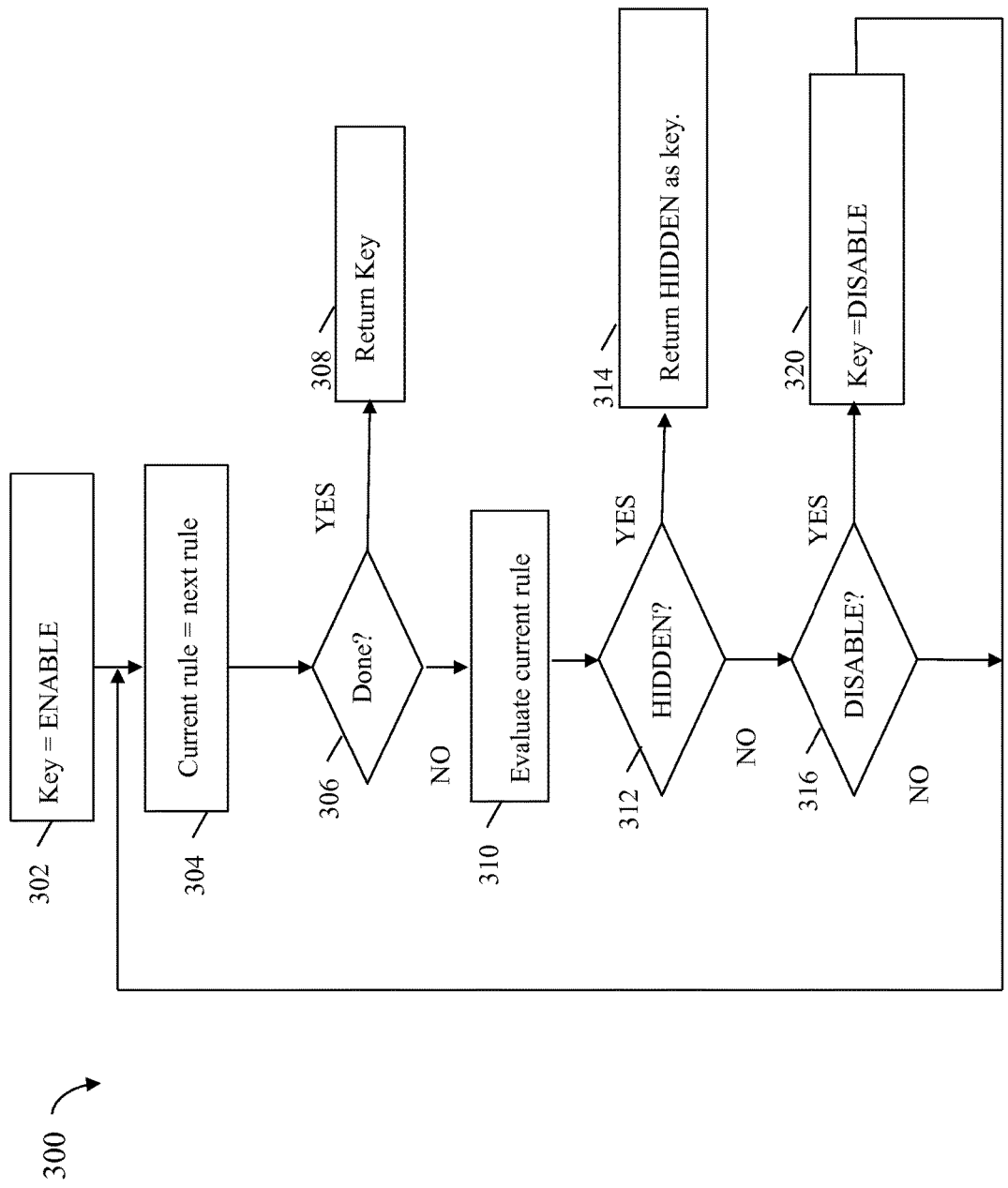
FIGS. 4 and 10 are flowcharts of processing steps that may be performed in an embodiment in accordance with techniques herein.

Referring to FIG. 4, shown is a flowchart 300 of processing steps that may be performed in an embodiment in accordance with techniques herein. The flowchart 300 may be performed by the rules engine 240 when performing rule evaluation by sequentially evaluating rules relevant to the particular key whose value is being determined. The flowchart 300 summarizes processing as described above and represented in the state diagram 400 of FIG. 3. At step 302, the key is initially assigned a value of ENABLE. At step 304, current rule is assigned the next rule to be evaluated. At step 306, a determination is made as to whether all the rules relevant to the current key have been evaluated. If step 306 evaluates to yes, control proceeds to step 308 to return the current value of the key. If step 306 evaluates to no, control proceeds to step 310 to evaluate the current rule. At step 312, a determination is made as to whether the current rule determined a value of HIDDEN for the key. If step 312 evaluates to yes, control returns to step 314 to return HIDDEN as the value for the key. If step 312 evaluates to no, control proceeds to step 316 where a determination is made as to whether the current rule determined a value of DISABLE for the key. If step 316 evaluates to yes, control proceeds to step 320 to assign the key the value of DISABLE. From step 316, control returns to step 304 to the next rule. If step 316 evaluates to no (meaning that the current rule determined a value of ENABLE for the key), control proceeds to step 304.

Figure 5:
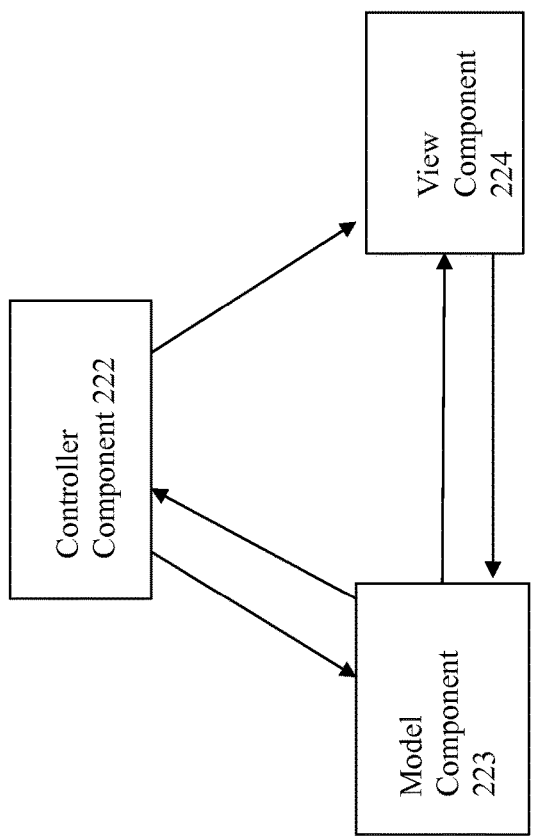
FIG. 5 is an example of components that may be included in a layout engine in an embodiment in accordance with techniques herein.

Referring to FIG. 5, shown is an example illustrating components that may be included in the layout engine in an embodiment in accordance with techniques herein. The example 250 includes a controller component 222, model component 223 and view component 224 whereby the example 250 denotes a template or paradigm for partitioning a software application when rendering a view for the UI display. The controller 222 may include the coding logical that controls interactions with the user and operates responsive to UI action such as, for example, responsive to selection of a menu item or button. The model 223 includes the objects or data whose information may be rendered in the UI display. The view 224 may be a component describing the output representation of information, such as a table of object data from the model 223. The controller 222 accepts input and converts the input to command for the model or view. For example, a command may be to update an item of data resulting in the command being sent from the controller to the model to update the data. The controller may also send commands to the view to change the view's presentation of the model (e.g., scrolling through a document). The model may notify the view and controller when there has been a change to its state thereby allowing the view to produce updated output and for the controller to possibly change the available set of commands. The view may request information from the model that is uses to generate an output presented to the user.

The view 224 may be a component including the layout information for the different UI elements and associated properties, such as the KEYS property described herein. In one embodiment in accordance with techniques herein, the controller 222 may embody the additional processing as described above performed at a local or UI element level for the particular UI display to determine whether the particular UI element should be enabled, disabled or hidden. Such additional processing may be based on additional view-specific logic and rationale. For example, such additional logic of the controller 222 may disable or hide a particular UI element to perform an operation, such as delete a LUN, if certain UI element level criteria are not met such as if the user has not also selected a LUN from a displayed LUN list in the current UI display.

With reference back to FIG. 2, in an embodiment in accordance with techniques herein, the layout engine 220 may perform processing to determine a final view state value (e.g., ENABLE, DISABLE or HIDDEN) for a UI element being rendered. The final view state value may be based on evaluation of UI element level criteria and feature level criteria that is relevant to the particular key.

Consider a further example based on the DELETE_LUN key described above.

Figure 6:
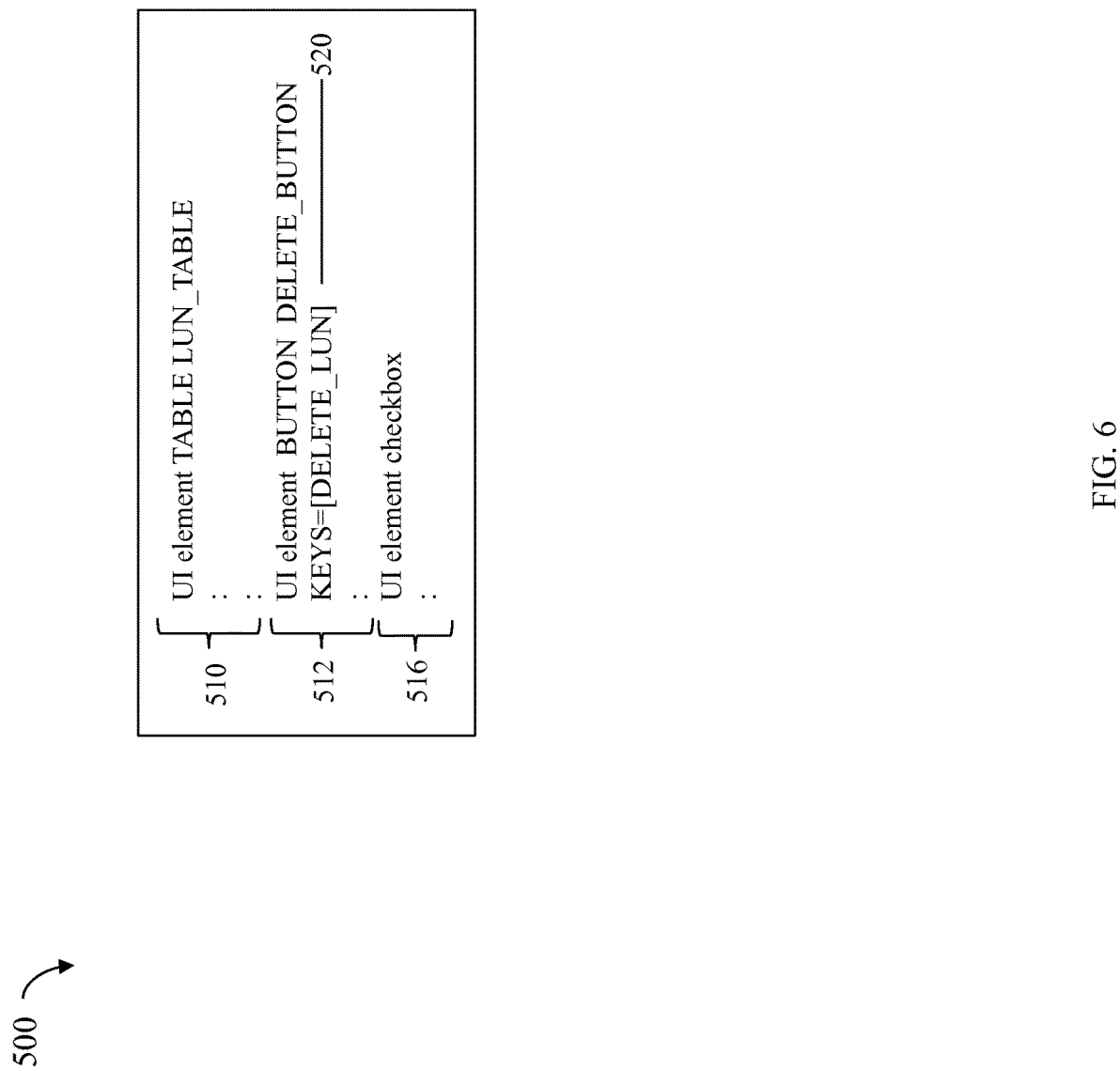
FIGS. 6 and 8 are examples of layout information for UI elements that may be used in an embodiment in accordance with techniques herein.

Referring to FIG. 6, shown is an example of layout information for a user interface view in an embodiment in accordance with techniques herein. The example 500 abstractly represents information defining UI elements in the view. In this example, the view includes a table of LUNs, LUN_TABLE, a button DELETE_BUTTON, and a checkbox next to each row of the LUN table. Element 510 represents information defining LUN_TABLE. Element 512 represents information defining DELETE_BUTTON. Element 516 represents information defining each checkbox next to each row of LUN table. Each of 510, 512 and 516 may, for example, specify different property values for a UI element affecting the "look and feel" of the UI element, for example, how any text is displayed (e.g., font size/type, whether text is bold, italic, underlined). As described herein, in one embodiment a KEYS property may be specified for a UI element identifying one or more relevant keys associated with the UI element (e.g., thereby tagging the UI element with the relevant keys). Tagging this UI element with a key indicates that this UI element is related to or associated with the feature or functionality associated with the key. In this example, the DELETE_BUTTON UI element defined by 512 includes line 520 defining the KEYS property to include the DELETE_LUN key.

As part of rendering the view denoted by 500, with reference back to FIG. 2, the layout engine 220 may query the feature manager 210 for the current value of the DELETE_LUN key. In turn, the feature manager 210 queries the rules engine 240 to determine the current value of the DELETE_LUN key. The rules engine 240 may perform processing as described elsewhere herein to evaluate relevant rules and determine a value of the DELETE_LUN key which is then returned from the rules engine 240 to the feature manager 210 and then to the layout engine 220.

Figure 7A:
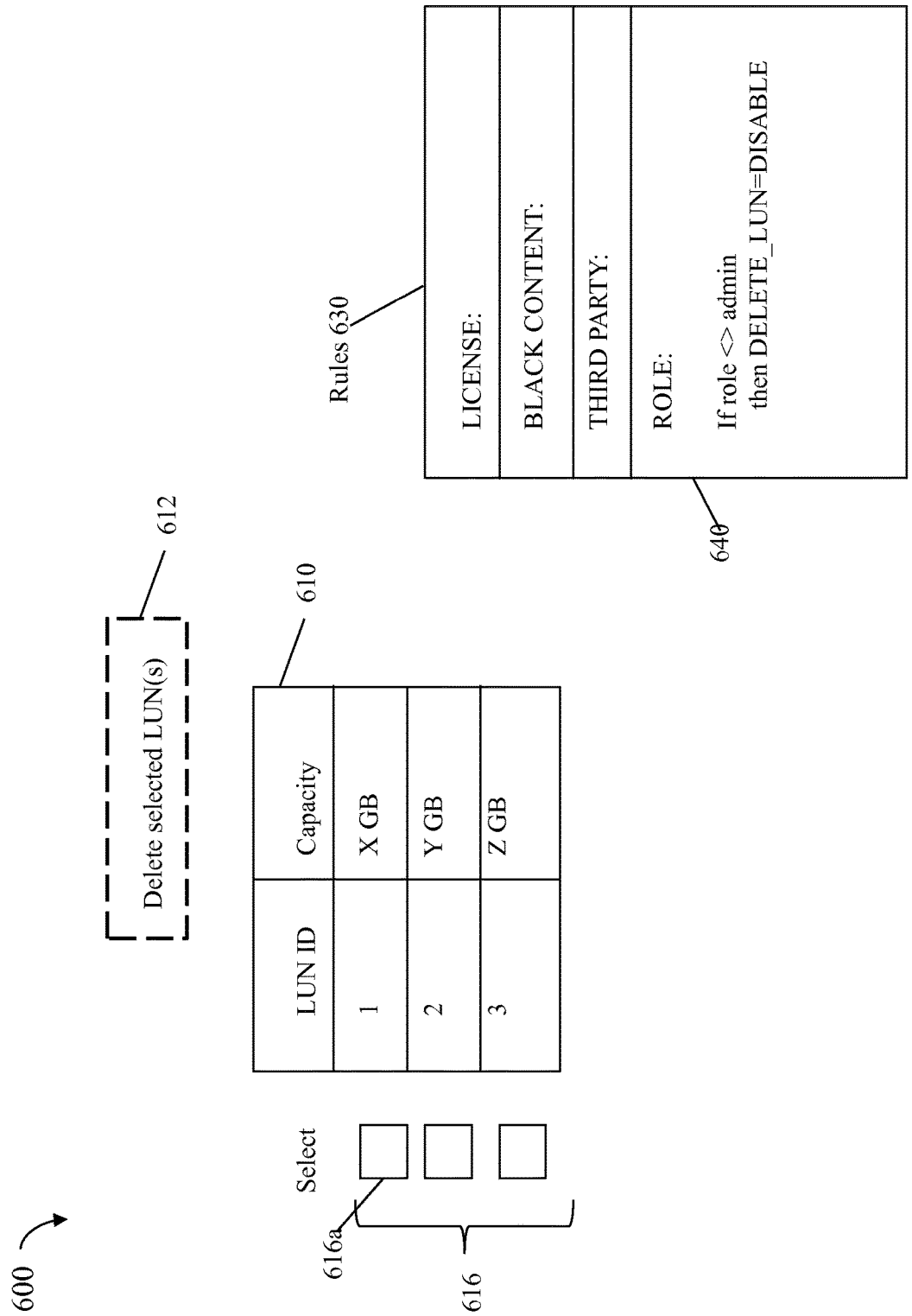
FIGS. 7A, 7B and 9 are examples of views rendered in UI displays and associated rules in an embodiment in accordance with techniques herein.

Referring to FIG. 7A, shown is an example 600 of a view that may be rendered by the layout engine in accordance with the layout and UI elements illustrated in FIG. 6. In the example 600, element 612 may be the representation of the DELETE_BUTTON UI element described by 512 of FIG. 6, element 610 may be the representation of the LUN_TABLE described by 510 of FIG. 6, and element 616 may represent the checkbox UI elements described by 516. In this example 600, the DELETE_BUTTON 612 is a dashed box denoting that the DELETE_BUTTON 612 is disabled whereby it is visible in the UI display but not functional or enabled for user interaction. Element 630 may denote the rules evaluated by the rules engine in this example.

The UI coding logic (e.g., as included an executed by a controller 222) performs processing responsive to selection of 612, when enabled. Responsive to selecting 612 when enabled, the selected one or more LUNs may be deleted and the UI display may be updated to remove the deleted LUNs from the table 610. A LUN in a row of the table 610 is denoted as selected if the checkbox next to the row is selected. For example, although no LUN is currently selected in the example 600, if checkbox 616a was selected, LUN 1 in row 1 would be selected. If there is no LUN currently selected as in the example 600, the coding logic may display DELETE_BUTTON 612 as disabled. Otherwise, if one or more LUNs are selected, the coding logic may indicate that the DELETE_BUTTON 612 should be enabled. The foregoing logic for the DELETE_BUTTON 612 may be encoded in code executed by a controller 222 where the UI coding logic is only concerned with local UI element level criteria and not the feature level criteria as evaluated by the rules engine.

The example 600 may represent the UI display at a first point in time when interacting with a user that has a role of operator and not admin. In this example, a role of operator may only allow the user to view information and a user with a role of operator may not be allowed to perform operations that modify the existing data storage system configuration, such as delete an existing LUN. A user needs to have a role of admin denoting advance administrative privileges in order to be able to delete a LUN. As a result, a rule 640 evaluated by the rules engine may be defined which assigns a value of DISABLE to the DELETE_LUN key if the role of the current user is not "admin" to ensure the foregoing rule of requiring a particular role in order to perform the functionality associated with the DELETE_LUN key.

As part of rendering the view 600, with reference back to FIG. 2, the layout engine 220 may query the feature manager 210 for the current value of the DELETE_LUN key. In turn, the feature manager 210 queries the rules engine 240 to determine the current value of the DELETE_LUN key. The rules engine 240 may perform processing as described elsewhere herein to evaluate relevant rules such as 640 and determine a value of the DELETE_LUN key Based on the rule 640 for the current user with a role of operator, the DELETE_LUN key value determined by the rules engine is DISABLE, which is then returned from the rules engine 240 to the feature manager 210 and then to the layout engine 220. Thus, the layout engine receives a value of DISABLE for the DELETE_LUN key based on feature-level criteria evaluated by the rules engine 240.

Additionally, the layout engine also determines a second, local value for the view state of the DELETE_BUTTON UI element based on evaluation of the UI element level criteria, if any, specified in the coding logic for the DELETE_BUTTON. The evaluation of the UI element level criteria may be performed in accordance with, or based on, a current context or state such as related to the UI display (e.g., what LUNs from the LUN table, if any are selected). Consistent with discussion above for the current example, coding logic within the layout engine for the current view may include the following:
If (LUN is selected from LUN_TABLE)
  then DELETE_BUTTON=ENABLE
  else DELETE_BUTTON=DISABLE
which indicates that if one or more LUNs are selected in the displayed LUN_TABLE 610, then the DELETE_BUTTON 612 should be ENABLEd and otherwise, the DELETE_BUTTON 612 should be DISABLEd.

Based on the foregoing coding logic, the layout engine determines a second, local value of DISABLE for the DELETE_BUTTON based on UI element level criteria expressed in the UI coding logic.

At this first point in time when rendering the view 600, the layout engine may determine whether the DELETE_BUTTON 612 should be enabled, disabled or hidden based on the value of the DELETE_LUN key (as determined by the rules engine based on evaluation of feature-level criteria expressed in the rules 630) and the view state for the UI element DELETE_BUTTON 612 as indicated by the second local value for the DELETE_BUTTON 612 based on UI element level criteria. In this example, the DELETE_LUN key and the foregoing second local value are both DISABLE so the layout engine determines a final value for the view state of the DELETE_BUTTON 612 whereby the DELETE_BUTTON 612 is rendered in a DISABLEd state as represented by the dashed line box in 612 of the example 600.

Figure 7B:
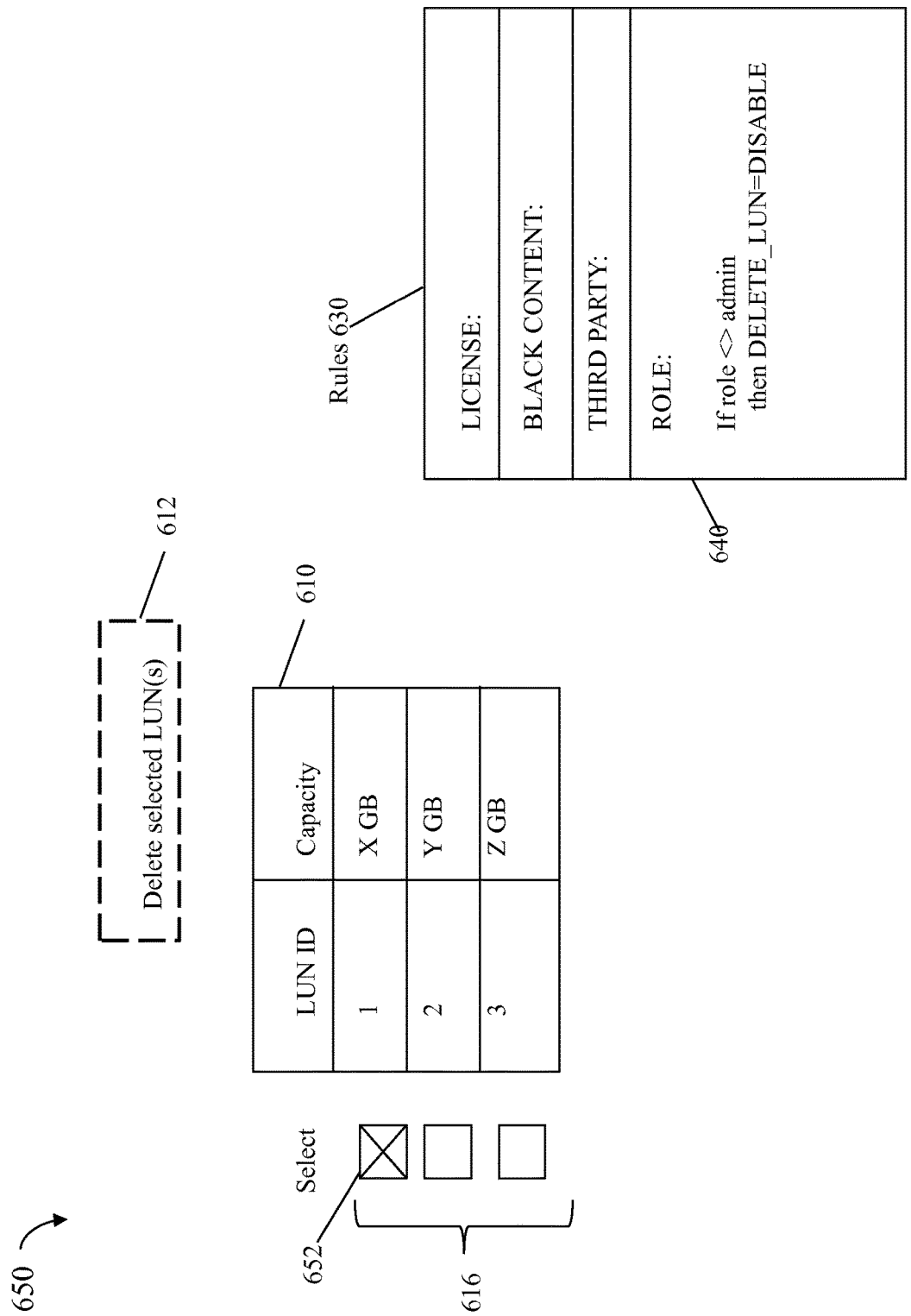

At a second point in time, assume the user selects a particular LUN from the LUN_TABLE 610 as illustrated in the example 650 of FIG. 7B. The LUN 1 is selected as indicated by the checkbox 652. Based on the above-mentioned coding logic for the UI element, the layout engine may determine a revised or updated value for the second local value denoting a view state for the UI element DELETE_BUTTON 612. At this second point in time, the user has selected a LUN so the coding logic determines that the DELETE_LUN button 612 should be ENABLEd. The layout engine once again performs processing to determine a final value for the view state of the DELETE_BUTTON 612 using both the value of the DELETE_LUN key (based on feature-level criteria) and also the second local value denoting a view state for the UI element DELETE_BUTTON 612 based on UI element level criteria. In this example, the DELETE_LUN key is DISABLE and the foregoing second local value is now ENABLE so the layout engine determines a final value for the view state of the DELETE_BUTTON 612 of DISABLE whereby the DELETE_BUTTON 612 is still rendered in a DISABLEd state as represented by the dashed line box in 612 of the example 650.

In an embodiment in accordance with techniques herein, the layout engine may further encode logic to ensure that any state of DISABLE as determined using feature level criteria supersedes any state of ENABLE as may be determined using the local UI element level criteria. Thus, as illustrated above, the final view state of the UI element is DISABLE.

Similarly, the layout engine may further encode logic to ensure that any state of HIDDEN as determined using feature level criteria supersedes any state of ENABLE or DISABLE as may be determined using the local UI element level criteria. Thus, in this latter case, the final view state of the UI element would be HIDDEN.

Generally, for a UI element tagged with a key, the layout engine may determine a final value for the view state of a UI element based on the value of the key (as determined using feature level criteria) and a second local value denoting the view state for the UI element based on evaluation of any UI element level criteria in accordance with, or based on, a current context or state such as related to the UI display (e.g., what LUNs from the LUN table, if any are selected). Each of the final value for the view state, the value of the key and the second local value is one of ENABLE, DISABLE or HIDDEN. The final value for the view state may be determined in accordance with the state transition diagram as illustrated in FIG. 3 which also illustrates valid state transitions for the view state of a UI element. The value of the key may denote a first view state which can only be further modified by the second local value (denoting a second view state) if the second local value indicates a valid state transition. For example, assume the DELETE_BUTTON UI element 612 as described above is associated with the DELETE_LUN key. The DELETE_LUN key may have a value of DISABLE (as determined by the rules engine based on feature level criteria) whereby DISABLE indicates the first state as 404. Further, assume the second local value for the DELETE_BUTTON, denoting its view state based on UI element level criteria, is ENABLE. It is noted that the second local value does not indicate a valid next state from the DISABLE state 404. Elements 414 and 416 indicate the set of valid transitions from the DISABLE state 404. Element 414 indicates that the DISABLE state may transition into or remain in the DISABLE state and element 416 indicates that the DISABLE state may transition into the HIDDEN state. However, there is no valid transition to the ENABLE state from the DISABLE state. In this case, the final view state for the DELETE_BUTTON is determined as DISABLE.

Generally, the view states may be ranked, from highest to lowest as follows: HIDDEN, DISABLE, ENABLE. The final view state of a UI element may be determined as the highest ranked view state associated with UI element. The final view state of the UI element may be based on a view state determined using UI element level criteria. If the UI element is tagged or associated with a key, the final view state may also be based on another view state denoted by the value of the key. Thus, the view state of the UI element may be determined based on the aggregate of the highest ranked view state denoted by the UI element level criteria in combination with any associated feature level criteria.

As a variation to the foregoing illustration of FIGS. 7A and 7B, assume the user has an associated role of admin rather than operator. In this case, the first point in time would still result in a display as in the example 600. At the second point in time with reference to the example 650, the rule 640 results in DELETE_LUN having a value of ENABLE and the second local value, denoting a view state for the DELETE_BUTTON based on UI level criteria, is ENABLE. For this variation, the DELETE_BUTTON 612 would be enabled when rendered in the UI display.

As described above in embodiment in accordance with techniques herein, since the DELETE_BUTTON UI element is associated with the DELETE_LUN key, the layout engine may determine a value for the DELETE_LUN key based on feature-level criteria. The value of the DELETE_LUN key denotes a first view state for the DELETE_BUTTON UI element based on feature-level criteria. The controller may also determine a second view state for the DELETE_BUTTON UI element based on UI element level criteria for the DELETE_BUTTON. During operation to render UI elements, the layout engine may determine the final view state for the DELETE_BUTTON UI element based on the foregoing first and second view states. In particular, the first view state (based on feature level criteria) may serve as a first starting state which can only further be modified by the second view state if the second view state indicates a valid state transition per the state transition diagram of FIG. 3. Otherwise, the second view state does not result in further modifying the first view state for the DELETE_BUTTON UI element.

In this manner, the controller code embodying the logic for the UI element level criteria may be written by the UI developer independent of the feature level criteria as expressed in the rules evaluated by the rules engine.

It should be noted that the UI display rendered in connection with FIGS. 7A and 7B may also include other UI elements. For example, the UI display of FIGS. 7A and 7B may also include another UI element button, VIEW_BUTTON, which, if selected when enabled, results in updating the display to include more detail about one or more selected LUNs from the LUN table 610. In connection with VIEW_BUTTON, there may be no associated feature (e.g., no KEYS=property as with DELETE_BUTTON). However, the controller code may embody UI element level criteria similar to that as described above for the DELETE_BUTTON which indicates that the VIEW_BUTTON is ENABLEd only when one or more LUNs from the LUN table are selected. Otherwise, VIEW_BUTTON is DISABLEd. In this case, the final view state for VIEW_BUTTON is based only on the UI element level criteria (e.g. whether a LUN is selected in the current UI display).

Consider another example based on the REPLICATE key described above.

Figure 8:
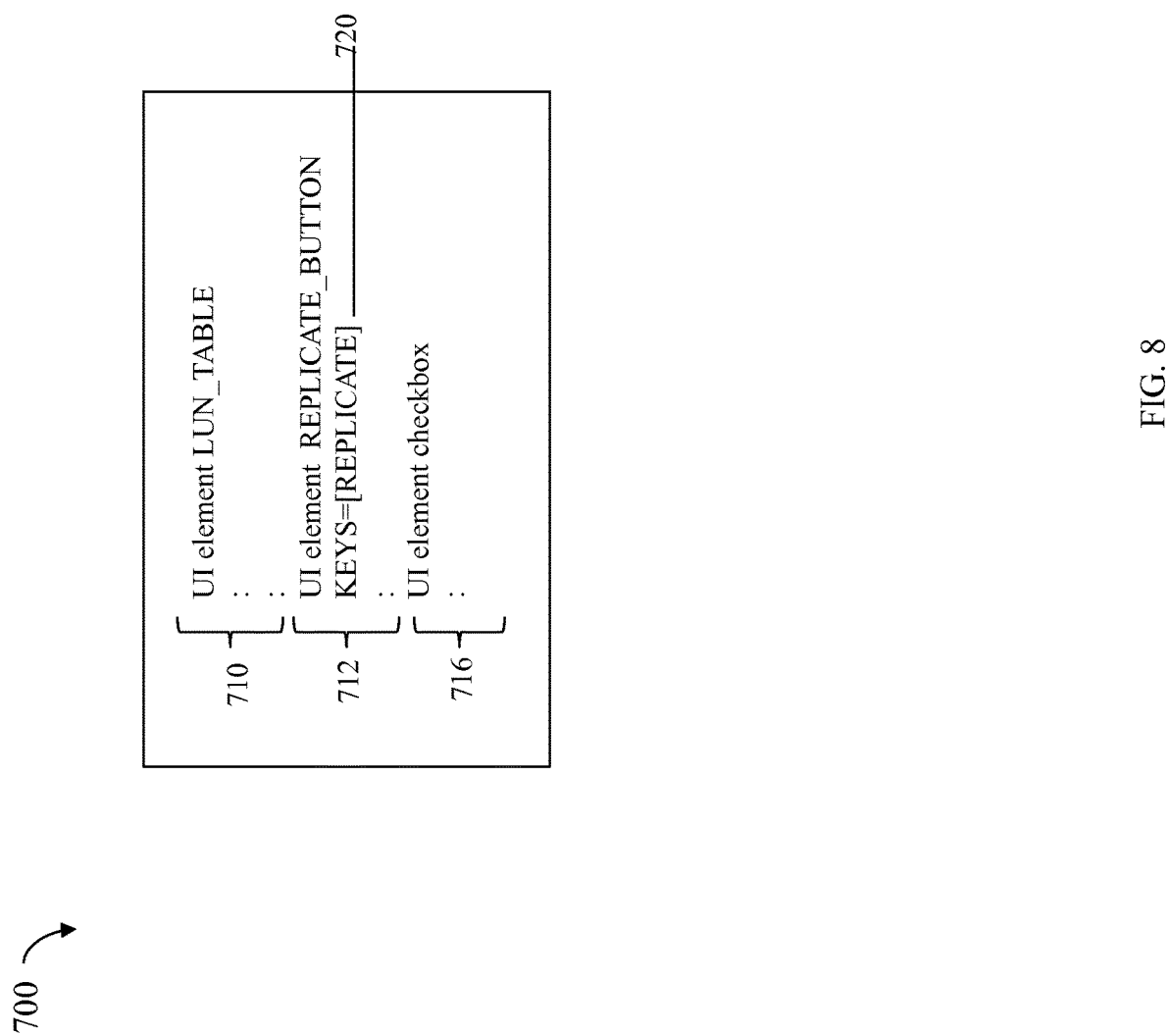

Referring to FIG. 8, shown is an example of layout information for a user interface view in an embodiment in accordance with techniques herein. The example 700 abstractly represents information defining UI elements in the view. In this example, the view includes a table of LUNs, LUN_TABLE, a first button REPLICATE_BUTTON, and a checkbox next to each row of the LUN table. Element 710 and 716 are respectively similar to 510 and 516 of FIG. 6. Element 710 represents information defining LUN_TABLE. Element 712 represents information defining REPLICATE_BUTTON. Element 716 represents information defining each checkbox next to each row of LUN table. Each of 710, 712 and 716 may, for example, specify different property values for a UI element affecting the "look and feel" of the UI element, for example, how any text is displayed (e.g., font size/type, whether text is bold, italic, underlined). As described herein, in one embodiment a KEYS property may be specified for a UI element identifying one or more relevant keys associated with the UI element (e.g., thereby tagging the UI element with the relevant keys). Tagging this UI element with a key indicates that this UI element is related to or associated with the feature or functionality associated with the key. In this example, the REPLICATE_BUTTON UI element defined by 712 includes line 720 defining the KEYS property to include the REPLICATE key.

As part of rendering the view denoted by 500, with reference back to FIG. 2, the layout engine 220 may query the feature manager 210 for the current value of the REPLICATE key. In turn, the feature manager 210 queries the rules engine 240 to determine the current value of the REPLICATE key. The rules engine 240 may perform processing as described elsewhere herein to evaluate relevant rules and determine a value of the REPLICATE key which is then returned from the rules engine 240 to the feature manager 210 and then to the layout engine 220.

Figure 9:
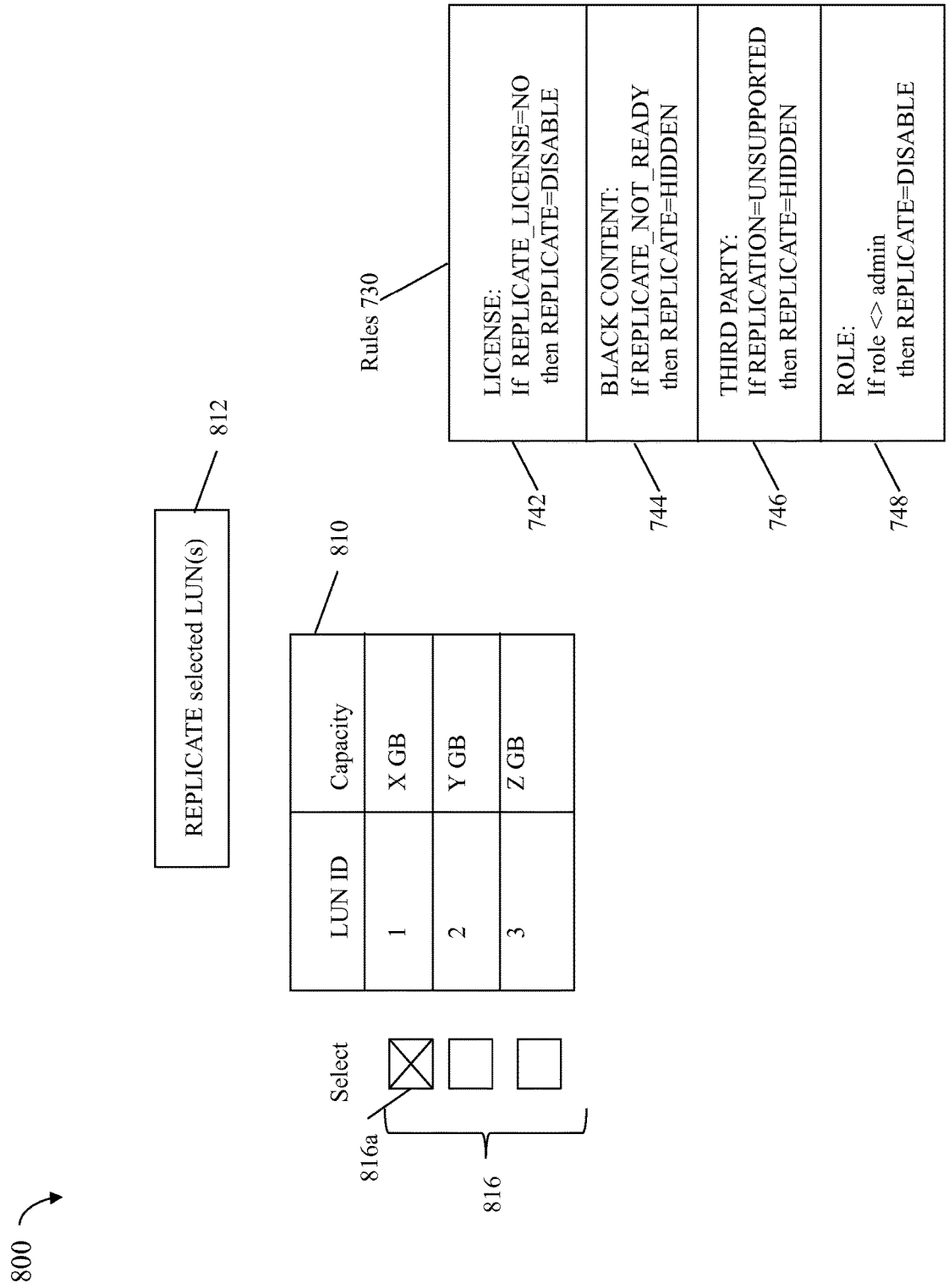

Referring to FIG. 9, shown is an example 800 of a view that may be rendered by the layout engine in accordance with the layout and UI elements illustrated in FIG. 8. In the example 800, element 812 may be the representation of the REPLICATE_BUTTON UI element described by 712 of FIG. 8, element 810 may be the representation of the LUN_TABLE described by 710 of FIG. 8, and element 816 may represent the checkbox UI elements described by 716. Element 630 may denote the rules evaluated by the rules engine in this example.

The UI coding logic (e.g., as included an executed by a controller 222) performs processing responsive to selection of 812, when enabled. Responsive to selecting 812 when enabled, the selected one or more LUNs may be replicated. A LUN in a row of the table 810 is denoted as selected as described above. For example, checkbox 816a is selected indicating that LUN 1 in row 1 is selected. If there is no LUN currently selected, the coding logic may display REPLICATE_BUTTON 812 as disabled. Otherwise, if one or more LUNs are selected, the coding logic may indicate that the REPLICATE_BUTTON 812 should be enabled. The foregoing logic for the REPLICATE_BUTTON 812 may be encoded in code executed by a controller 222 where the UI coding logic is only concerned with evaluating local UI element level criteria and not the feature level criteria as evaluated by the rules engine. The evaluation of the UI element level criteria may be performed in accordance with, or based on, a current context or state such as related to the UI display (e.g., what LUNs from the LUN table, if any are selected.

In this example the rules 730 may include 4 relevant rules 742, 744, 746 and 748 for the REPLICATE key reflecting feature-level criteria relevant to the REPLICATE key. Rule 742 relates to a license concern or criteria. In one embodiment, the replication facility may require a license. In rule 742, REPLICATE_LICENSE may denote whether the current system has the required replication license whereby REPLICATE_LICENSE has a value of YES if the system has the required license and NO if otherwise. Evaluation of rule 742 indicates that if there is no replicate license, the value of the REPLICATE key is DISABLE.

Rule 744 relates to a black content concern or criteria. In rule 744, REPLICATE_NOT_READY may denote whether the replication feature and associated functionality is ready and operational whereby REPLICATE_NOT_READY has a value of YES if the replication facility and functionality is ready and operational, and NO if otherwise. Evaluation of rule 744 indicates that if the replication facility functionality is not ready or operational, the value of the REPLICATE key is HIDDEN.

Rule 746 relates to a third party concern or criteria. In rule 746, REPLICATION may denote whether the replication feature and associated functionality is supported by the third party whereby REPLICATION has a value of SUPPORTED if the replication facility and functionality is supported by the third party, and UNSUPPORTED if otherwise. Evaluation of rule 746 indicates that if the replication facility functionality is not supported, the value of the REPLICATE key is HIDDEN.

Rule 748 relates to role of a current user similar to that as described above. In rule 748, role may denoted the role of the current user of the application. In one embodiment as described herein, if the role of the current user is not admin, then the user is not allowed to perform replication operations. Thus, if the role of the current user is not admin, then the REPLICATE key is DISABLE.

As part of rendering the view 800, with reference back to FIG. 2, the layout engine 220 may query the feature manager 210 for the current value of the REPLICATE key. In turn, the feature manager 210 queries the rules engine 240 to determine the current value of the REPLICATE key. The rules engine 240 may perform processing as described elsewhere herein to evaluate relevant rules such as 742, 744 746 and 748 to determine a value of the REPLICATE key.

As a first case, consider a current state or context where the user has a role of operator, the data storage system has the proper required replication license (e.g., REPLICATE_LICENSE=YES as in rule 742), the replication facility is operational and ready and not considered black content (e.g., REPLICATE_NOT_READY=FALSE), replication is supported by the third party providing the data storage system and application (e.g., REPLICATION=SUPPORTED). As described elsewhere herein in connection with FIGS. 3 and 4, processing of the rules 730 begins with rule 742 which results in REPLICATE key having a value of ENABLE. Processing continues with evaluation of rule 744 which results in REPLICATE key having a value of ENABLE. Processing continues with evaluation of rule 746 which results in REPLICATE key having a value of ENABLE. Processing continues with evaluation of rule 748 which results in REPLICATE key have a value of DISABLE which is then returned from the rules engine 240 to the feature manager 210 and then to the layout engine 220. Thus, the layout engine receives a value of DISABLE for the REPLICATE key based on feature-level criteria evaluated by the rules engine 240.

Additionally, the layout engine also determines a second, local value denoting the view state for the REPLICATE_BUTTON UI element based on the UI element level criteria, if any, specified in the coding logic. Consistent with discussion above for the current example, coding logic within the layout engine for the current view may include the following:

If (LUN is selected from LUN_TABLE)
   then REPLICATE_BUTTON=ENABLE
   else REPLICATE_BUTTON=DISABLE which indicates that if one or more LUNs are selected in the displayed LUN_TABLE 810, then the REPLICATE_BUTTON 812 should be ENABLEd and otherwise, the REPLICATE_BUTTON 812 should be DISABLEd.

Based on the foregoing coding logic, the layout engine determines a second, local value of ENABLE for the DELETE_BUTTON based on UI element level criteria expressed in the UI coding logic.

For this first case when rendering the view 800, the layout engine may determine whether the REPLICATE_BUTTON 812 should be enabled, disabled or hidden based on the value of the REPLICATE key (as determined by the rules engine based on evaluation of feature-level criteria expressed in the rules 730) and the view state for the UI element REPLICATE_BUTTON 812 as indicated by the second local value for the REPLICATE_BUTTON 812 based on UI element level criteria. In this example, the REPLICATE key is DISABLE and the foregoing second local value is ENABLE so, consistent with discussion above in connection with FIG. 3, the layout engine determines a final value for the view state of the REPLICATE_BUTTON 812 whereby the REPLICATE_BUTTON 812 is rendered in a DISABLEd state.

As a second case with reference to 800, consider a current state or context where the user has a role of admin, the data storage system does not have the proper required replication license (e.g., REPLICATE_LICENSE=NO as in rule 742), the replication facility is not operational and ready and is therefore considered black content (e.g., REPLICATE_NOT_READY=TRUE), replication is supported by the third party providing the data storage system and application (e.g., REPLICATION=SUPPORTED). As described elsewhere herein in connection with FIGS. 3 and 4, processing of the rules 730 begins with rule 742 which results in REPLICATE key having a value of DISABLE. Processing continues with evaluation of rule 744 which results in REPLICATE key having a value of HIDDEN. As described in connection with FIG. 4 processing, the rule evaluation may terminate since the REPLICATE key has a value of HIDDEN and the only possible valid transitions as indicated in FIG. 3 remain in the HIDDEN state. An embodiment does not need to proceed with evaluation of rules 746 and 748 since neither rule can further revise the value of the REPLICATE key. The rules engine 240 returns a value of HIDDEN or the REPLICATE key to the feature manager 210 and then to the layout engine 220. Thus, the layout engine receives a value of HIDDEN for the REPLICATE key based on feature-level criteria evaluated by the rules engine 240.

At this point, the layout engine does not need to further determine a second, local value denoting the view state for the REPLICATE_BUTTON UI element based on the UI element level criteria, if any, specified in the coding logic. As discussed above, the REPLICATE key value denotes a first view state for the REPLICATE_BUTTON based on feature level criteria and the second local value denotes a second view state for the REPLICATE_BUTTON based on UI element level criteria. The final view state for the REPLICATE button is based on the combination of the foregoing first and second view states. However, as also discussed herein, if any one of the foregoing two view states is HIDDEN, the final view state is HIDDEN based on possible valid transitions from the HIDDEN state in FIG. 3.

However, for completeness of discussion, determination of the second local value for the second case is included below. The layout engine may determine the second, local value denoting the view state for the REPLICATE_BUTTON UI element based on the UI element level criteria, if any, specified in the coding logic. Consistent with discussion above for the current example, coding logic within the layout engine for the current view may include the following:

If (LUN is selected from LUN_TABLE)
  then REPLICATE_BUTTON=ENABLE
  else REPLICATE_BUTTON=DISABLE which indicates that if one or more LUNs are selected in the displayed LUN_TABLE 810, then the REPLICATE_BUTTON 812 should be ENABLEd and otherwise, the REPLICATE_BUTTON 812 should be DISABLEd.

Based on the foregoing coding logic, the layout engine determines a second, local value of ENABLE for the DELETE_BUTTON based on UI element level criteria expressed in the UI coding logic.

For this second case when rendering the view 800, the layout engine may determine whether the REPLICATE_BUTTON 812 should be enabled, disabled or hidden based on the value of the REPLICATE key (as determined by the rules engine based on evaluation of feature-level criteria expressed in the rules 730) and the view state for the UI element REPLICATE_BUTTON 812 as indicated by the second local value for the REPLICATE_BUTTON 812 based on UI element level criteria. In this example with the second case, the REPLICATE key is HIDDEN and the foregoing second local value is ENABLE so, consistent with discussion above in connection with FIG. 3, the layout engine determines a final value for the view state of the REPLICATE_BUTTON 812 whereby the REPLICATE_BUTTON 812 is rendered in HIDDEN state.

In one embodiment in accordance with techniques herein, once the layout engine determines the key value associated with a UI element and the key value is DISABLE or HIDDEN, any subsequent calls or attempts to ENABLE the UI element (such as based on UI element level for the UI element in coding logic of the controller) may be ignored. In a similar manner, once the layout engine determines the key value associated with a UI element and the key value is HIDDEN, any subsequent calls or attempts to ENABLE or DISABLE the UI element (such as based on UI element level for the UI element in coding logic of the controller) may be ignored.

Figure 10:
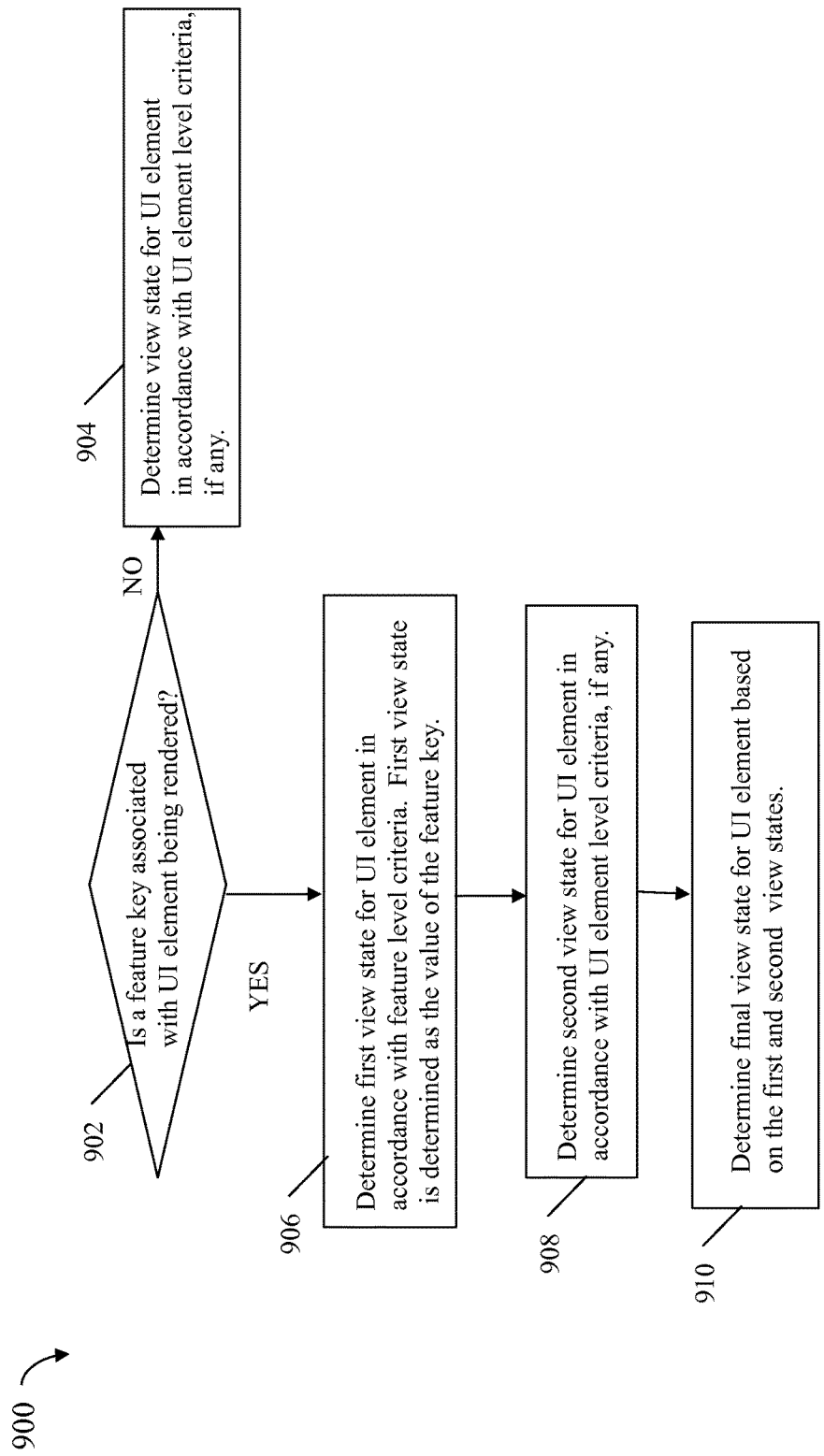

Referring to FIG. 10, shown is a flowchart of processing steps that may be performed in an embodiment in accordance with techniques herein when rendering a UI element in a UI display. The flowchart 900 summarizes processing steps as described above in connection with determining a final view state as one of ENABLE, DISABLE or HIDDEN for a UI element being rendered. At step 902, a determination may be made with respect to the UI element being rendered as to whether the UI element is associated with a feature key. If step 902 evaluates to no, control proceeds to step 904 to determine a view state for the UI element in accordance with UI element level criteria, if any, as may be embodied in coding logic of the controller. If step 902 evaluates to yes, control proceeds to step 906 where a first view state for the UI element is determined in accordance with feature level criteria. The feature level criteria may be evaluated in light of the current context or state such as related to different one of the feature level criteria such as state of the data storage system, current role of the user performing the interaction, currently installed software on the data storage system, currently valid licenses for the data storage system and application, and the like. The first view state may be the value of the feature key as determined by the rules engine when evaluating rules relevant to the feature key based on the current state or context.

At step 908, the second view state is determined for the UI element in accordance with UI element level criteria, if any.

The evaluation of the UI element level criteria may be performed in accordance with, or based on, a current context or state such as related to the UI display (e.g., what LUNs from the LUN table, if any are selected) or more generally any current context or state information related to, or used in, the UI element level criteria. Such UI element level criteria may be embodied in coding logic of the controller as described elsewhere herein. The UI element level criteria may be characterized as local or specific to the particular view and current UI display (e.g., whether a LUN is currently selected). Generally, the second view state may be determined as ENABLE unless otherwise modified to DISABLE or HIDDEN by UI element level criteria encoded in the controller which affects the UI element currently being rendered. At step 910, a final view state for the UI element may be determined based on the first and second view states.

Referring to FIG. 11, shown is a table summarizing final view states of a UI element based on a first view state and a second view state in an embodiment in accordance with techniques herein. The table 1000 summarizes final view states as described herein for a UI element tagged or associated with a key and for which UI element level criteria is specified in coding logic of the controller. The first view state denotes the value of the key as determined by the rules engine based on feature level criteria evaluated in accordance with the current context or state information. The second view state denotes the view state determined in accordance with UI element level criteria, relevant to the particular UI element, where the UI element level criteria may be specified in coding logic of the controller for the particular view. The table 1000 is consistent with valid state transitions as discussed herein and, for example, as illustrated in FIGS. 3 and 4. Column 1002 indicates possible first view states. Column 1004 indicates possible second view states. Column 1006 indicates final view states. A row in the table 1000 indicates a final view state in column 1006 for the particular combination of first view state in column 1002 and second view state in column 1004. Row 1010 indicates that if the first view state is hidden, the final view state 1006 is also hidden for any/all values of the second view state. Row 1012 indicates that if the second view state is hidden, the final view state is also hidden for any/all values of the first view state. Row 1014 indicates that if the first view state is disable and the second view state is enable, the final view state is disable. Row 1016 indicates that if the first view state is enable and the second view state is disable, the final view state is disable. Row 1018 indicates that if both the first and second view states are enable, the final view state is also enable.

As described herein, the first view state may be determined using the state transition diagram of FIG. 3 and the processing described in FIG. 4. The final view state may be determined by then determining the second view state and then determining whether there exists a valid transition in the state transition diagram of FIG. 3 denoting a transition from the first view state to the second view state. If there is no valid transition denoting a transition from the first view state to the second view state, the first view state is the final view state. If there is a valid transition denoting a transition from the first view state to the second view state, the final view state is the second view state.

It should be noted that examples illustrated herein include tagging or associating a UI element with only a single key. More generally, a UI element may be tagged or associated with multiple keys. In this case, an aggregated final view state of the UI element may be based on the values of the multiple keys in combination with the second view state (denoting a view state based on UI element level criteria). In such a case, consistent with description herein, the aggregated final view state may be HIDDEN if any of the keys or second view state is HIDDEN. The aggregated final view state may be DISABLE if any of the keys or second view state is DISABLE and none of the keys or second view state is HIDDEN. The aggregated final view state may be ENABLE if all the keys and the second view state are ENABLE.

As will also be appreciated by those skilled in the art, UI elements may be included in a hierarchy, for example, where a first UI element may be a parent including one or more child UI elements. For example, a first UI element may be a form including multiple input fields, buttons, and the like where all such input fields and buttons are child UI elements of the parent first UI element. In this case, an embodiment may allow tagging or associating feature keys with UI elements at any one or more suitable levels in the hierarchy. Such an embodiment may further define how feature keys associated with a parent UI element affects its child UI element. For example, a feature key applied to a parent UI element may also apply to all of its child UI elements. Further, a value of a feature key or view state as determined for a parent UI element may also affect the value of the feature key or view state of its child UI elements. Similarly, a value of a feature key or view state as determined for a child UI element may also affect the value of the feature key or view state for its parent UI element. For example, in one embodiment, if a parent UI element has a view state of hidden or disabled, the children UI elements of that parent may also be respectively hidden or disabled. If all child UI elements are hidden, the parent UI element may also be hidden. If all child UI elements are either disabled or hidden, and at least one is disabled, the parent UI element may be disabled. If at least one child UI element is enabled (neither hidden nor disabled), the parent UI element may be enabled. The foregoing are some examples of how such an embodiment with a multi-level hierarchy of UI elements may determine feature values and view states for such UI elements.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of determining view states for user interface elements comprising: tagging a plurality of user interface elements with a feature key denoting that each of the plurality of user interface elements is associated with a same feature or functionality denoted by the feature key, wherein the same feature or functionality denoted by the feature key is included in any of: a data replication facility and a data deduplication facility, wherein the plurality of user interface elements comprises a parent user interface element that includes a plurality of child user interface elements when displayed, and wherein responsive to tagging the parent user interface element with the feature key whereby the feature key applies to the parent user interface element, the feature key is also applied to the plurality of child interface elements;

determining whether a user interface element is associated with the feature key;

responsive to determining the user interface element is associated with the feature key, performing first processing to determine a final view state for the user interface element, the first processing including:

determining, in accordance with feature level criteria and a current context, a first value for the feature key associated with the user interface element, said first value denoting a first view state for the user interface element, wherein the feature level criteria includes at least one criteria related to an operating mode of a data storage system and wherein a limited set of operations and features are exposed through a user interface including the user interface element when the current context indicates a current operating mode of the data storage system is the operating mode, wherein said feature level criteria indicates that a first license is required to use the same feature or functionality denoted by the feature key and wherein the first value of the feature key is disable if the first license is not installed thereby disabling user interface elements tagged with the feature key;

determining, in accordance with user interface element level criteria regarding a current state of a currently rendered view in the user interface and the current context, a second value for a second view state for the user interface element, wherein the user interface element denotes a feature or functionality performed with respect to one or more logical devices currently selected from a list in the currently rendered view of the user interface, and wherein the user interface element level criteria indicates that the second value for the second view state of the user interface element is disable if no logical device is selected from the list in the currently rendered view of the user interface; and determining a final view state for the user interface element in accordance with the first view state and the second view state;

responsive to determining the user interface element is not associated with the feature key, determining, in accordance with the user interface element level criteria and the current context, the final view state for the user interface element, wherein the final view state is not determined using the feature level criteria; and rendering the user interface element in the user interface in accordance with the final view state.

2. The method of claim 1, wherein the feature key is a property of the user interface element.

3. The method of claim 1, wherein the feature level criteria is included in one or more rules.

4. The method of claim 3, wherein said determining the first value includes evaluating the one or more rules in accordance with the current context.

5. The method of claim 4, wherein the first view state is hidden, enable or disable, the second view state is hidden, enable or disable, and the one or more rules includes a plurality of rules evaluated in a sequential order where evaluation of the plurality of rules stops upon a first of the plurality of rules determining a value of hidden for the first value.

6. The method of claim 5, wherein the final view state is hidden if any of the first view state and the second view state are hidden.

7. The method of claim 6, wherein the final view state is disable if any of the first view state and the second view state is disable and none of the first view state and second view state are hidden.

8. The method of claim 7, wherein the final view state is enable if both the first view state and the second view state are enable.

9. The method of claim 1, wherein the feature level criteria further includes one or more criteria related to any of: role of a user interacting with user interface, black content, and whether a feature or functionality is supported by a third party.

10. The method of claim 1, wherein the current context includes any of a current state of the data storage system, the current operating mode of the data storage system, installed software on the data storage system, hardware on the data storage system, valid licenses for data storage facilities or services on the data storage system, role of a user interacting with the user interface, one or more features or functionality which are designated as black content and thereby not operational, and one or more features or functionality that is unsupported.

11. The method of claim 1, wherein said user interface element is any of a menu, a menu bar, a menu item, a text box, a button, a navigation section including one or more hyperlinks, a hyperlink, a table, a drop-down list, a list box, a check box, a dialog box, a wizard, a table, a column of a table, a form, a field of a form, and a combo box.

12. The method of claim 1, method comprising: determining whether the data storage system has the first license, that is required to use the same feature of functionality denoted by the first feature key, installed; responsive to determining the first license required is not installed, setting the first value for the first view state and the first feature key to disable indicating to render user interface elements, including the plurality of user interface elements, tagged with the first feature key in a disabled view state; and responsive to determining the first license required is installed, setting the first value for the first view state and the first feature key to enable indicating to render user interface elements, including the plurality of user interface elements, that are tagged with the first feature key in an enabled view state.

13. The method of claim 1, further comprising: receiving a plurality of feature keys each denoting a different feature or functionality performed by an application, wherein the feature key is a first of the plurality of feature keys; and specifying layout information defining the plurality of user interface elements of the application to be rendered in the user interface, wherein said layout information defines said plurality of user interface elements and associated properties including a keys property for each of the plurality of user interface elements that identifies one or more of the plurality of feature keys relevant for said each user interface element, said specifying including said tagging the plurality of user interface elements with the first feature key denoting that each of the plurality of user interface elements includes user interface content of the same feature or functionality that requires the first license for use.

14. The method of claim 13, wherein a second of the plurality of user interface elements is tagged with at least two of the plurality of feature keys including the first feature key and a second of the plurality of feature keys denoting that the second user interface element is associated with the same feature or functionality of the first feature key and is also associated with a second feature or functionality denoted by the second feature key.

15. A non-transitory computer readable medium comprising code store thereon that, when executed, performs a method comprising:

tagging a plurality of user interface elements with a feature key denoting that each of the plurality of user interface elements is associated with a same feature or functionality denoted by the feature key, wherein the same feature or functionality denoted by the feature key is included in any of: a data replication facility and a data deduplication facility, wherein the plurality of user interface elements comprises a parent user interface element that includes a plurality of child user interface elements when displayed, and wherein responsive to tagging the parent user interface element with the feature key whereby the feature key applies to the parent user interface element, the feature key is also applied to the plurality of child interface elements;

determining whether a user interface element is associated with the feature key;

responsive to determining the user interface element is associated with the feature key, performing first processing to determine a final view state for the user interface element, the first processing including:

determining, in accordance with feature level criteria and a current context, a first value for the feature key associated with the user interface element, said first value denoting a first view state for the user interface element, wherein the feature level criteria includes at least one criteria related to an operating mode of a data storage system and wherein a limited set of operations and features are exposed through a user interface including the user interface element when the current context indicates a current operating mode of the data storage system is the operating mode, wherein said feature level criteria indicates that a first license is required to use the same feature or functionality denoted by the feature key and wherein the first value of the feature key is disable if the first license is not installed thereby disabling user interface elements tagged with the feature key;

determining, in accordance with user interface element level criteria regarding a current state of a currently rendered view in the user interface and the current context, a second value for a second view state for the user interface element, wherein the user interface element denotes a feature or functionality performed with respect to one or more logical devices currently selected from a list in the currently rendered view of the user interface, and wherein the user interface element level criteria indicates that the second value for the second view state of the user interface element is disable if no logical device is selected from the list in the currently rendered view of the user interface; and determining a final view state for the user interface element in accordance with the first view state and the second view state;

responsive to determining the user interface element is not associated with the feature key, determining, in accordance with the user interface element level criteria and the current context, the final view state for the user interface element, wherein the final view state is not determined using the feature level criteria;

and rendering the user interface element in the user interface in accordance with the final view state.

16. A system comprising:
a data storage system;
a processor; and
a memory including first code stored thereon for a data storage system management application, the first code, when executed, performs a method of determining view states for user interface elements comprising:

tagging a plurality of user interface elements with a feature key denoting that each of the plurality of user interface elements is associated with a same feature or functionality denoted by the feature key, wherein the same feature or functionality denoted by the feature key is included in any of: a data replication facility and a data deduplication facility, wherein the plurality of user interface elements comprises a parent user interface element that includes a plurality of child user interface elements when displayed, and wherein responsive to tagging the parent user interface element with the feature key whereby the feature key applies to the parent user interface element, the feature key is also applied to the plurality of child interface elements;

determining whether a user interface element is associated with the feature key;

responsive to determining the user interface element is associated with the feature key, performing first processing to determine a final view state for the user interface element, the first processing including:

determining, in accordance with feature level criteria and a current context, a first value for the feature key associated with the user interface element, said first value denoting a first view state for the user interface element, wherein the feature level criteria includes at least one criteria related to an operating mode of the data storage system and wherein a limited set of operations and features are exposed through a user interface including the user interface element when the current context indicates a current operating mode of the data storage system is the operating mode, wherein said feature level criteria indicates that a first license is required to use the same feature or functionality denoted by the feature key and wherein the first value of the feature key is disable if the first license is not installed thereby disabling user interface elements tagged with the feature key;

determining, in accordance with user interface element level criteria regarding a current state of a currently rendered view in the user interface and the current context, a second value for a second view state for the user interface element, wherein the user interface element denotes a feature or functionality performed with respect to one or more logical devices currently selected from a list in the currently rendered view of the user interface, and wherein the user interface element level criteria indicates that the second value for the second view state of the user interface element is disable if no logical device is selected from the list in the currently rendered view of the user interface; and determining a final view state for the user interface element in accordance with the first view state and the second view state;

responsive to determining the user interface element is not associated with the feature key, determining, in accordance with the user interface element level criteria and the current context, the final view state for the user interface element, wherein the final view state is not determined using the feature level criteria; and rendering the user interface element in the user interface in accordance with the final view state.

17. The system of claim 16, wherein the feature key is a property of the user interface element.

18. The system of claim 16, wherein the feature level criteria is included in one or more rules.

19. The system of claim 18, wherein said determining the first value includes evaluating the one or more rules in accordance with the current context.

20. The system of claim 16, wherein the feature level criteria further includes one or more criteria related to any of: role of a user interacting with user interface, black content, and whether a feature or functionality is supported by a third party.

* * * * *